United States Patent
Fuse et al.

(10) Patent No.: US 8,520,277 B2
(45) Date of Patent: Aug. 27, 2013

(54) IMAGE PROCESSING APPARATUS, IMAGE PROCESSING METHOD, AND STORAGE MEDIUM

(75) Inventors: Koji Fuse, Tokyo (JP); Takafumi Niida, Tokyo (JP); Tomokazu Yanai, Yokohama (JP); Takashi Ochiai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 13/191,237

(22) Filed: Jul. 26, 2011

(65) Prior Publication Data

US 2012/0033277 A1    Feb. 9, 2012

(30) Foreign Application Priority Data

Aug. 3, 2010 (JP) ................. 2010-174789
Sep. 1, 2010 (JP) ................. 2010-195706

(51) Int. Cl.
*G06K 15/00* (2006.01)
*H04N 1/46* (2006.01)

(52) U.S. Cl.
USPC ........ 358/533; 358/3.03; 358/3.06; 358/3.09; 358/3.1; 358/3.12; 358/3.14; 358/3.26; 358/534; 358/535; 358/536

(58) Field of Classification Search
None
See application file for complete search history.

(56) References Cited

FOREIGN PATENT DOCUMENTS

| JP | 8-051536 A | | 2/1996 |
|---|---|---|---|
| JP | 09238259 | * | 9/1997 |
| JP | 2007-129558 A | | 5/2007 |

OTHER PUBLICATIONS

Human translation of JP Pub 09238259 to Shuichi Otsuka.*

* cited by examiner

*Primary Examiner* — Benny Q Tieu
*Assistant Examiner* — Haris Sabah
(74) *Attorney, Agent, or Firm* — Canon USA, Inc., IP Division

(57) ABSTRACT

An image processing apparatus may include a first screen processing unit, a moiré component calculation unit, a first correction unit, and a second screen processing unit. The first screen processing unit performs screen processing on image data to form screen processed image data. The moiré component calculation unit calculates an original moiré component that corresponds to a low-frequency component of the screen processed image data and a low-frequency component of the image data. The first correction unit corrects the image data based on a calculated moiré component. The second screen processing unit performs the screen processing on the corrected image data.

20 Claims, 23 Drawing Sheets

| 50 | 50 | 50 | 50 | 50 | 50 | 50 | 50 |
|---|---|---|---|---|---|---|---|
| 75 | 75 | 75 | 75 | 75 | 75 | 75 | 75 |
| 50 | 50 | 50 | 50 | 50 | 50 | 50 | 50 |
| 25 | 25 | 25 | 25 | 25 | 25 | 25 | 25 |
| 0 | 0 | 0 | 0 | 0 | 0 | 0 | 0 |
| 25 | 25 | 25 | 25 | 25 | 25 | 25 | 25 |
| 50 | 50 | 50 | 50 | 50 | 50 | 50 | 50 |
| 75 | 75 | 75 | 75 | 75 | 75 | 75 | 75 |

↓

302 — Th_c

| 214 | 228 | 208 | 154 | 124 | 148 | 213 | 247 |
|---|---|---|---|---|---|---|---|
| 240 | 254 | 234 | 180 | 122 | 116 | 179 | 213 |
| 232 | 246 | 226 | 172 | 70 | 51 | 65 | 148 |
| 190 | 204 | 184 | 83 | 29 | 9 | 24 | 72 |
| 78 | 140 | 133 | 75 | 22 | 2 | 16 | 65 |
| 44 | 110 | 134 | 102 | 48 | 29 | 43 | 91 |
| 45 | 149 | 187 | 192 | 163 | 90 | 103 | 128 |
| 79 | 195 | 234 | 240 | 211 | 149 | 195 | 153 |

↓

303 — Out_c

| 0 | 0 | 0 | 0 | 0 | 255 | 255 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 255 | 255 | 0 | 0 | 0 |
| 0 | 0 | 0 | 255 | 255 | 255 | 0 | 0 |
| 0 | 0 | 0 | 0 | 255 | 0 | 0 | 0 |

FIG.4
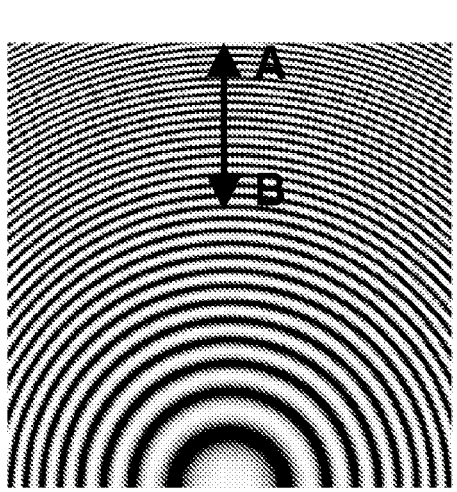
D_k
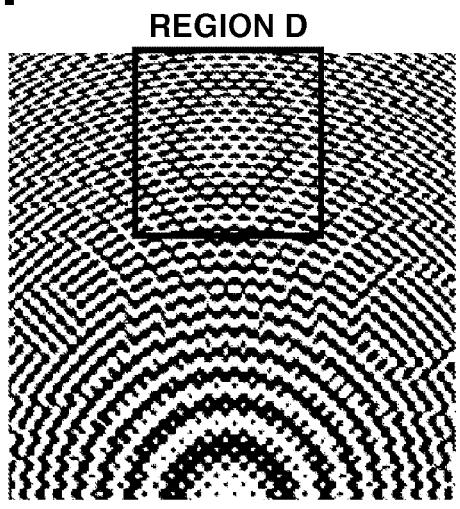
Out_k
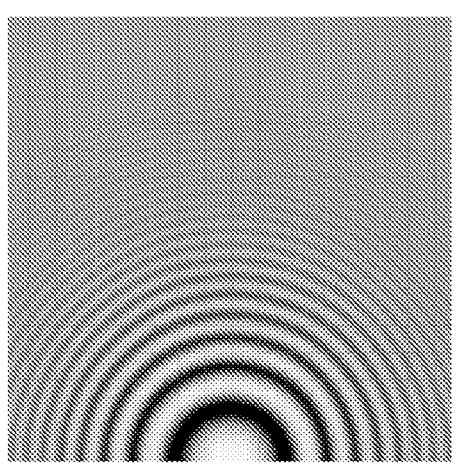
D_f_k
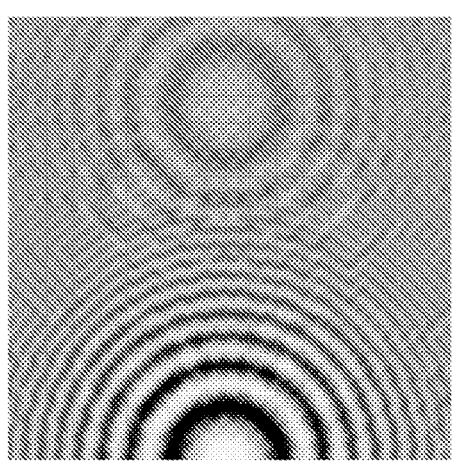
Out_f_k
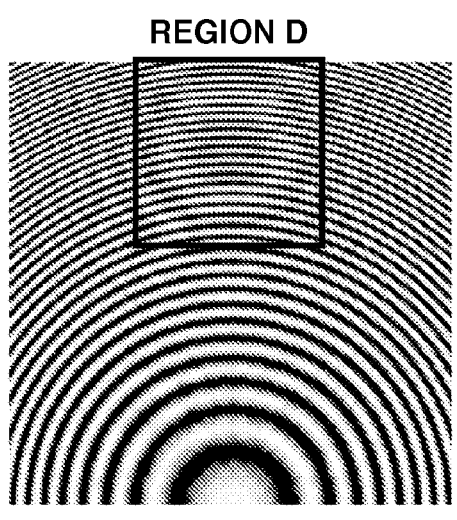
D1_k
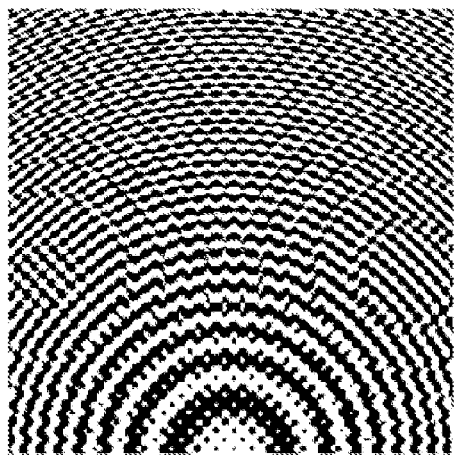
Out1_k

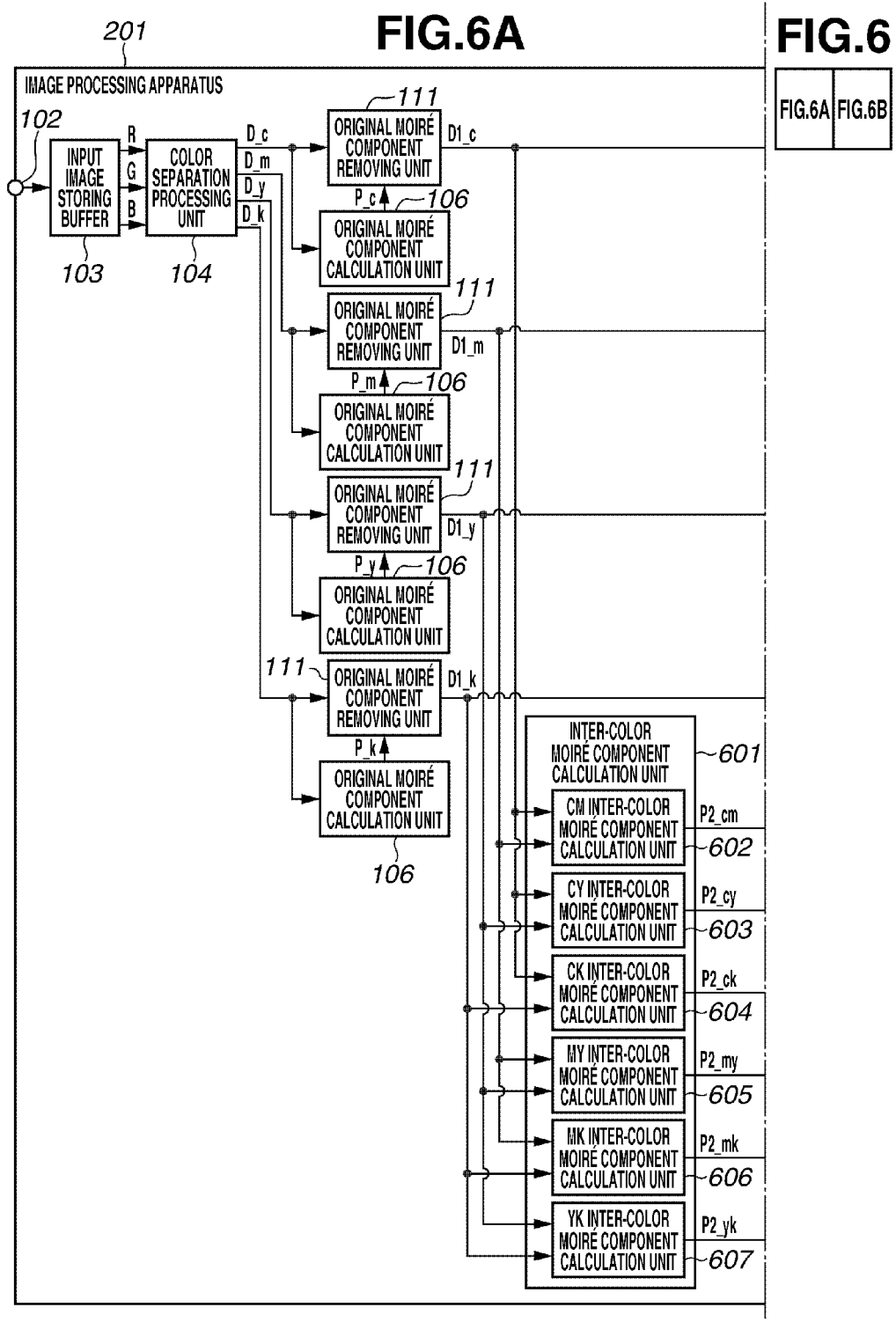

| FIG.12A | FIG.12B |

| 0 | 0 | 0 | 0 | 0 | 0 | 0 | 0 | 0 | 0 | 0 |
|---|---|---|---|---|---|---|---|---|---|---|
| 0 | 0 | 0 | 0.01 | 0.01 | 0.01 | 0.01 | 0.01 | 0 | 0 | 0 |
| 0 | 0 | 0.01 | 0.01 | 0.01 | 0.01 | 0.01 | 0.01 | 0.01 | 0 | 0 |
| 0 | 0.01 | 0.01 | 0.01 | 0.02 | 0.02 | 0.02 | 0.01 | 0.01 | 0.01 | 0 |
| 0 | 0.01 | 0.01 | 0.02 | 0.02 | 0.02 | 0.02 | 0.02 | 0.01 | 0.01 | 0 |
| 0 | 0.01 | 0.01 | 0.02 | 0.02 | 0.03 | 0.02 | 0.02 | 0.01 | 0.01 | 0 |
| 0 | 0.01 | 0.01 | 0.02 | 0.02 | 0.02 | 0.02 | 0.02 | 0.01 | 0.01 | 0 |
| 0 | 0.01 | 0.01 | 0.01 | 0.02 | 0.02 | 0.02 | 0.01 | 0.01 | 0.01 | 0 |
| 0 | 0 | 0.01 | 0.01 | 0.01 | 0.01 | 0.01 | 0.01 | 0.01 | 0 | 0 |
| 0 | 0 | 0 | 0.01 | 0.01 | 0.01 | 0.01 | 0.01 | 0 | 0 | 0 |
| 0 | 0 | 0 | 0 | 0 | 0 | 0 | 0 | 0 | 0 | 0 |

1702:

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0.01 | 0.08 | 0.01 | 0 | 0 | 0 | 0 |
| 0 | 0 | 0 | 0 | 0.08 | 0.64 | 0.08 | 0 | 0 | 0 | 0 |
| 0 | 0 | 0 | 0 | 0.01 | 0.08 | 0.01 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

FIG.19
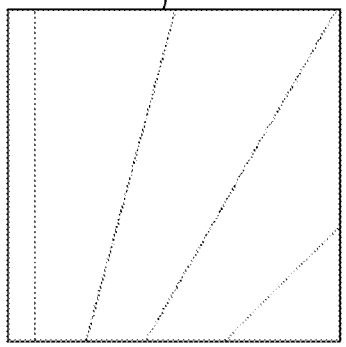
1901 INPUT IMAGE
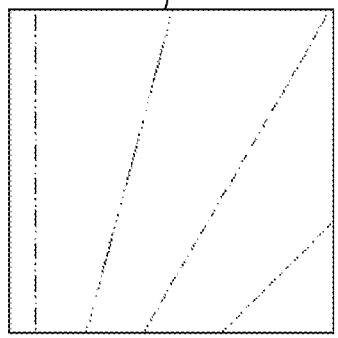
1902
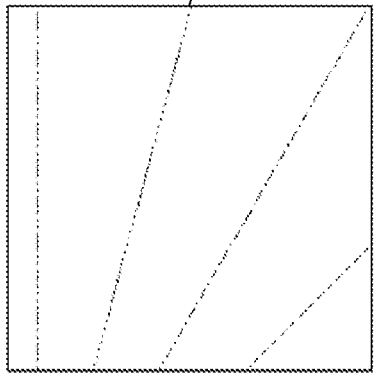
1903
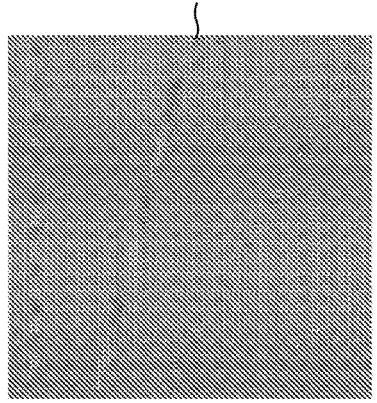
1904
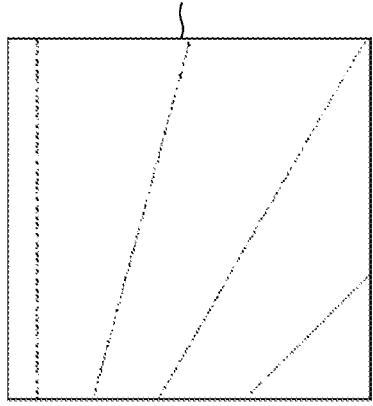
1905
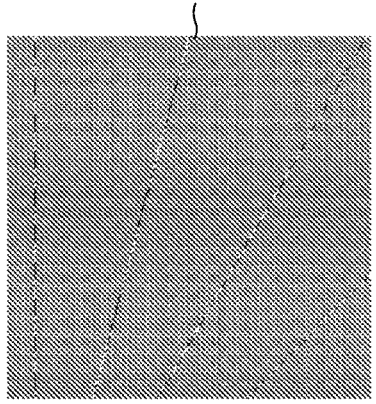
1906

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus that performs screen processing, and also relates to an image processing method including the screen processing.

2. Description of the Related Art

The method for forming an area gradation image is conventionally known and used to realize a tone reproduction of an image on a recording medium. The area gradation is characterized by changing the ratio of coloring material adhesion regions to express a gradation image. An amplitude modulation (AM) screen and a frequency modulation (FM) screen are representative ones.

The AM screen can express a gradation image by modulating the size of each coloring material adhesion region (i.e., the size of a so-called halftone dot). The factors defining the AM screen include the shape of each halftone dot, the direction along which halftone dots are arranged (i.e., angle of halftone dots), and the density of periodically arranged halftone dots (i.e., the number of lines).

On the other hand, the FM screen can be used to express a gradation pattern based on a change in the density of dots. To this end, isolated minute dots having a constant size are arranged in a pseudo random manner. If the FM screen is employed, it is required to record minute dots stably. Therefore, in a case where an image forming apparatus cannot form minute dots stably, it is useful to employ the AM screen to obtain a stable output.

A moiré pattern includes an interference pattern created, for example, when two grids are overlaid at an angle, or when they have slightly different mesh sizes. If the AM screen is employed to perform printing, original moiré may occur. The original moiré is a periodic pattern that may occur when a high-frequency component of an input image interferes with periodically arranged halftone dots. The high-frequency component of the input image can be visually recognized when folded into the low-frequency region. The following two methods are conventionally known as a practical method capable of reducing the original moiré.

The method discussed in Japanese Patent Application Laid-Open No. 08-051536 includes performing filter processing on an input image and removing a frequency component that may cause moiré from the input image. The method discussed in Japanese Patent Application Laid-Open No. 2007-129558 employs the FM screen including isolated minute dots arranged in a pseudo random manner, instead of using the AM screen, if the original moiré occurs when the AM screen is used.

However, the frequency component that may cause moiré is a high-frequency component that is adjacent to a screen frequency. Therefore, if the method discussed in Japanese Patent Application Laid-Open No. 08-051536 is employed, an input image may be blurred out.

Further, if the method using the FM screen as discussed in Japanese Patent Application Laid-Open No. 2007-129558 is employed by a recording apparatus that cannot form dots stably, a formed image may have noticeable roughness.

SUMMARY OF THE INVENTION

The present invention is directed to an image processing apparatus and an image processing method, which are capable of reducing original moiré to obtain a high-quality output image.

According to an aspect of the present invention, an image processing apparatus includes: a first screen processing unit configured to perform screen processing on image data to form screen processed image data; a moiré component calculation unit configured to calculate an original moiré component that corresponds to a low-frequency component of the screen processed image data and a low-frequency component of the image data; a first correction unit configured to correct the image data based on a calculated moiré component; and a second screen processing unit configured to perform the screen processing on the corrected image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates example screen processing performed on cyan color separated duty data.

FIG. 4 illustrates black plane images generated when a black color circular zone plate chart having each side of approximately 5 mm is processed by the image processing apparatus according to the first exemplary embodiment.

FIG. 17 illustrates example filter coefficients that can be used in filter processing according to the fifth exemplary embodiment.

FIG. 19 illustrates images each including thin lines, as practical examples that reveal effects obtainable according to the fifth exemplary embodiment.

DESCRIPTION OF THE EMBODIMENTS

Various exemplary embodiments, features, and aspects of the invention will be described in detail below with reference to the drawings.

Although example configurations are described in the following exemplary embodiments, the present invention is not limited to the illustrated configurations.

Figure 1:
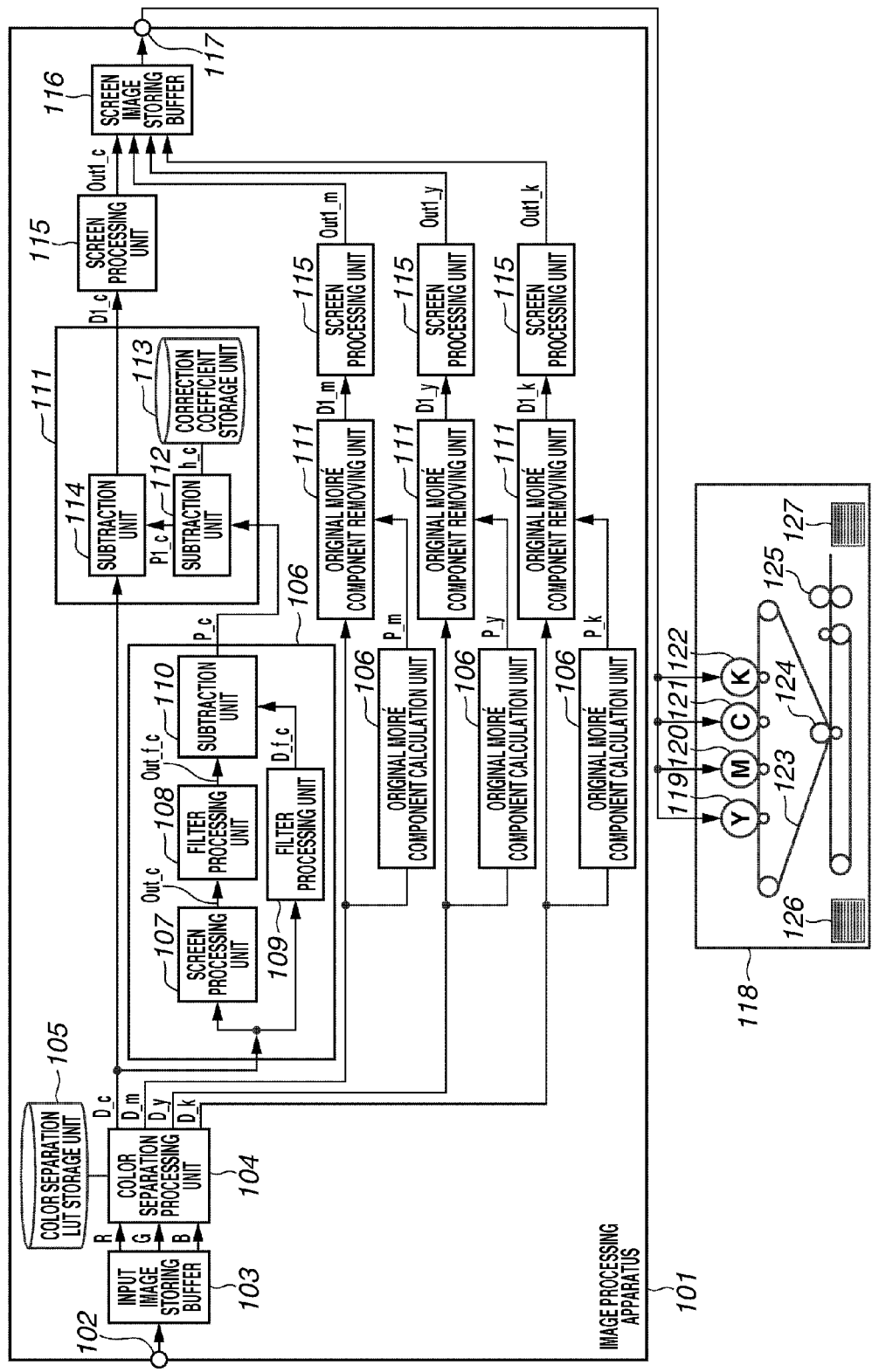
FIG. 1 is a block diagram illustrating a configuration of an image processing apparatus and an image forming apparatus according to a first exemplary embodiment.

First, a first exemplary embodiment is described in detail below. FIG. 1 is a block diagram illustrating an example configuration of an image processing apparatus and an image forming apparatus according to the first exemplary embodiment.

The system illustrated in FIG. 1 includes an image processing apparatus 101 and an image forming apparatus 118. The image processing apparatus 101 is, for example, a general personal computer on which a driver dedicated to the image forming apparatus 118 is installed. In this case, each functional unit of the image processing apparatus 101 can be realized when the computer executes a predetermined program. As another example configuration, for example, the image forming apparatus 118 can be configured to include the image processing apparatus 101.

The image processing apparatus 101 and the image forming apparatus 118 are mutually connected via an interface or a circuit. The image processing apparatus 101 includes an image data input terminal 102 via which printing target image data can be input and an input image storing buffer 103 that stores the input image data.

A color separation processing unit 104 can separate the image data stored in the input image storing buffer 103 into coloring material values that correspond to coloring material colors of the image forming apparatus 118, referring to a color separation LUT stored in a color separation lookup table (LUT) storage unit 105.

An original moiré component removing unit 111 can remove an original moiré component calculated by an original moiré component calculation unit 106 from each coloring material value separated by the color separation processing unit 104. The original moiré component calculation unit 106 can calculate the original moiré component based on each coloring material value separated by the color separation processing unit 104.

A screen processing unit 115 can perform screen processing on each coloring material value output from the original moiré component removing unit 111 and store the screen processed data in a screen image storing buffer 116.

The screen processed data stored in the screen image storing buffer 116 can be output, via an output terminal 117, to the image forming apparatus 118. In the present exemplary embodiment, the original moiré component represents the moiré between the original and a screen.

In FIG. 1, a screen processing unit 107 is an application example of a first screen processing unit. A subtraction unit 110 is an application example of a first calculation unit. The original moiré component removing unit 111 is an application example of a first correction unit. The screen processing unit 115 is an application example of a second screen processing unit.

The image forming apparatus 118 includes four photosensitive drums 119, 120, 121, and 122, an intermediate transfer belt 123, a transfer member 124, a fixing device 125, a paper feed tray 126, and a paper discharge tray 127. The image forming apparatus 118 illustrated in FIG. 1 can use four, e.g., cyan (C), magenta (M), yellow (Y), and black (K), coloring materials.

In the image forming apparatus 118, a plurality of latent images can be formed on the photosensitive drums 119, 120, 121, and 122 of respective colors according to screen processed data supplied from the image processing apparatus 101 and developed with cyan, magenta, yellow, and key (black) (CMYK) coloring materials to form images of respective colors.

The images of the CMYK coloring materials formed on respective photosensitive drums 119, 120, 121, 122 of respective colors are then transferred onto the intermediate transfer belt 123. A full-color image (i.e., a composite multicolor image) is formed on the intermediate transfer belt 123. The image on the intermediate transfer belt 123 is then transferred onto a paper supplied from the paper feed tray 126 at the transfer member 124. Then, the image on the paper is fixed by the fixing device 125 and conveyed to the paper discharge tray 127.

Figure 2:
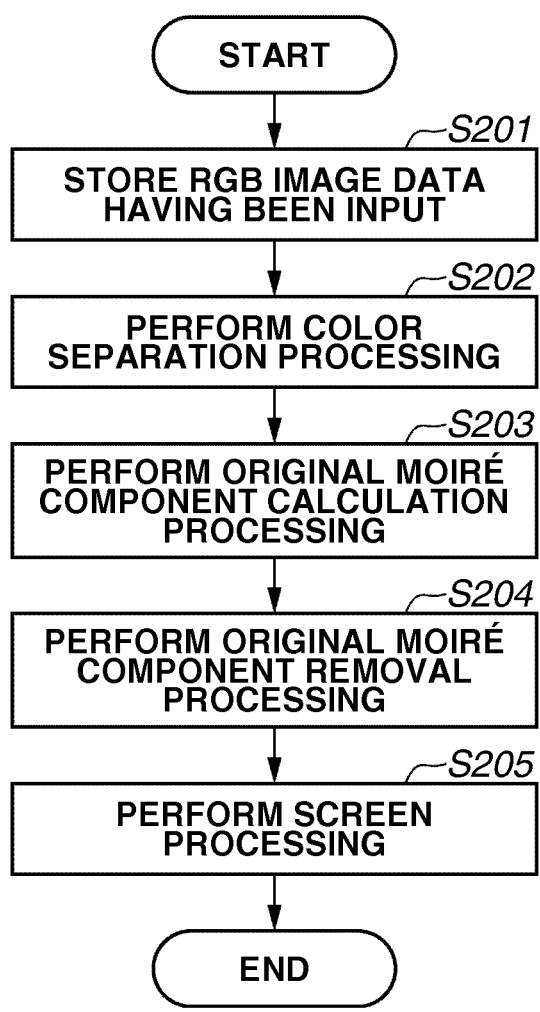
FIG. 2 is a flowchart illustrating an image processing method that can be implemented by the image processing apparatus according to the first exemplary embodiment.

Next, an image processing method that can be implemented by the image processing apparatus 101 according to the present exemplary embodiment is described below with reference to a flowchart illustrated in FIG. 2.

First, in step S201, the image processing apparatus 101 receives multi-gradational image data from the input terminal 102 and stores the multi-gradational image data in the input image storing buffer 103. In the present exemplary embodiment, the image data is color image data of three, e.g., red (R), green (G), and blue (B), color components.

Next, in step S202, the color separation processing unit 104 performs color separation processing on the multi-gradational image data stored in the input image storing buffer 103 using the color separation LUT stored in the color separation LUT storage unit 105, to realize conversion from red, green, and blue (RGB) coloring material planes to CMYK coloring material planes. In the present exemplary embodiment, the color separation processing unit 104 generates an 8-bit pixel data as a result of the color separation processing. However, the number of gradations in the conversion is not limited to the above-described example.

The image forming apparatus according to the present exemplary embodiment uses four types of coloring materials, i.e., CMYK coloring materials. Therefore, the image processing apparatus 101 (the color separation processing unit 104) converts the input RGB image data into image data of four planes that correspond to the CMYK coloring materials. More specifically, as defined by the following formulae (1) to (4), the color separation processing unit 104 generates color separated duty data D_c, D_m, D_y, and D_k (0 to 255) of four types of planes that correspond to the four types of coloring materials.

$$D\_c = C\_LUT\_3D(R,G,B) \quad \text{formula (1)}$$

$$D\_m = M\_LUT\_3D(R,G,B) \quad \text{formula (2)}$$

$$D\_y = Y\_LUT\_3D(R,G,B) \quad \text{formula (3)}$$

$$D\_k = K\_LUT\_3D(R,G,B) \quad \text{formula (4)}$$

In the present exemplary embodiment, respective functions defined by the right sides of the formulae (1) to (4) correspond to the content of the color separation LUT. The color separation LUT is for obtaining four (CMYK) output values from three (RGB) input values. When the color separation processing unit 104 completes the above-described processing in step S202, the image processing apparatus 101 accomplishes the color separation processing according to the present exemplary embodiment.

Next, in step S203, the original moiré component calculation unit 106 calculates original moiré components. Hereinafter, example processing that can be performed by the original moiré component calculation unit 106 is described in detail below with reference to FIG. 1.

The original moiré component calculation unit 106 includes the screen processing unit 107, two filter processing units 108 and 109, and the subtraction unit 110. For a purpose of simplifying the description, FIG. 1 illustrates the constituent components 107 to 110 for only the cyan (C) duty data processing block.

The screen processing unit 107 performs AM screen processing on the color separated duty data D_c, D_m, D_y, and D_k generated by the color separation processing unit 104 and outputs screen processed data Out_c, Out_m, Out_y, and Out_k. These screen processed data may include original moiré generated due to interference between the color separated duty data and the AM screen.

The screen processing unit 107 stores a threshold value table for a color to be subjected to the screen processing. More specifically, the screen processing unit 107 stores one of threshold value tables Th_c, Th_m, Th_y, and Th_k of CMYK colors. The screen processing unit 107 compares the color separated duty data of a color to be processed with the threshold value table of the color to be processed for each pixel, and outputs screen processed data. In the present exemplary embodiment, to simplify the following description, example screen processing for the cyan color data is described below.

FIG. 3 illustrates example screen processing performed on 8×8 pixel cyan color separated duty data D_c 301. A threshold value table Th_c 302 stores threshold values of corresponding pixel positions.

The screen processing unit 107 performs processing defined by the following formulae (5) and (6) on the cyan color separated duty data D_c 301 of each pixel, using a threshold value (0 to 255) of the corresponding pixel position, and obtains a cyan data Out_c 303. The threshold values stored in the threshold value table Th_c 302 is a group of threshold values that correspond to addresses on a printing image, as illustrated in FIG. 3.

$$\text{If } D\_c \leq Th\_c, \text{ then Out}\_c = 0 \quad \text{formula (5)}$$

$$\text{If } Th\_c < D\_c, \text{ then Out}\_c = 255 \quad \text{formula (6)}$$

In addition to the above-described processing for the cyan data, the screen processing unit 107 can perform similar screen processing on the magenta, yellow, and black data, and can obtain screen processed data of all colors, i.e., cyan data Out_c, magenta data Out_m, yellow data Out_y, and black data Out_k.

Next, the filter processing unit 108 performs filter processing using a predetermined low-pass filter (LPF) on the screen processed data Out_c, Out_m, Out_y, and Out_k that include original moiré components, as defined by the following formulae (7) to (10). Thus, the original moiré component calculation unit 106 can calculate and generate screen processed data low-frequency components Out_f_c, Out_f_m, Out_f_y, and Out_f_k.

$$\text{Out}\_f\_c = \text{Out}\_c * \text{LPF} \quad \text{formula (7)}$$

$$\text{Out}\_f\_m = \text{Out}\_m * \text{LPF} \quad \text{formula (8)}$$

$$\text{Out}\_f\_y = \text{Out}\_y * \text{LPF} \quad \text{formula (9)}$$

$$\text{Out}\_f\_k = \text{Out}\_k * \text{LPF} \quad \text{formula (10)}$$

In each of the formulae (7) to (10), the mark * represents convolution.

The filter processing unit 109 performs filter processing using a predetermined low-pass filter LPF on the color separated duty data D_c, D_m, D_y, and D_k, as defined by the following formulae (11) to (14). Thus, the original moiré component calculation unit 106 can calculate and generate color separated duty low-frequency components D_f_c, D_f_m, D_f_y, and D_f_k.

$$D\_f\_c = D\_c * \text{LPF} \quad \text{formula (11)}$$

$$D\_f\_m = D\_m * \text{LPF} \quad \text{formula (12)}$$

$$D\_f\_y = D\_y * \text{LPF} \quad \text{formula (13)}$$

$$D\_f\_k = D\_k * \text{LPF} \quad \text{formula (14)}$$

In each of the formulae (11) to (14), the mark * represents convolution.

Next, the subtraction unit 110 subtracts the color separated duty low-frequency components D_f_c, D_f_m, D_f_y, and D_f_k from the screen processed data low-frequency components Out_f_c, Out_f_m, Out_f_y, and Out_f_k, as defined by the following formulae (15) to (18). Thus, the original moiré component calculation unit 106 can calculate and generate original moiré components P_c, P_m, P_y, and P_k.

$$P\_c = (\text{Out}\_f\_c - D\_f\_c) \quad \text{formula (15)}$$

$$P\_m = (\text{Out}\_f\_m - D\_f\_m) \quad \text{formula (16)}$$

$$P\_y = (\text{Out}\_f\_y - D\_f\_y) \quad \text{formula (17)}$$

$$P\_k = (\text{Out}\_f\_k - D\_f\_k) \quad \text{formula (18)}$$

When the original moiré component calculation unit 106 completes the above-described processing in step S203, the original moiré component calculation processing according to the present exemplary embodiment is accomplished.

Next, in step S204, the original moiré component removing unit 111 removes the original moiré components. The original moiré component removing unit 111 includes a multiplication unit 112, a correction coefficient storage unit 113, and a subtraction unit 114. For a purpose of simplifying the description, FIG. 1 illustrates the constituent components 112 to 114 for only a cyan processing block.

First, the multiplication unit 112 multiplies the original moiré components P_c, P_m, P_y, and P_k by correction coefficients h_c, h_m, h_y, and h_k by, as defined by the following formulae (19) to (22). Thus, the original moiré component removing unit 111 can generate corrected original moiré components P1_c, P1_m, P1_y, and P1_k.

$$P1\_c = h\_c \times P\_c \qquad \text{formula (19)}$$

$$P1\_m = h\_m \times P\_m \qquad \text{formula (20)}$$

$$P1\_y = h\_y \times P\_y \qquad \text{formula (21)}$$

$$P1\_k = h\_k \times P\_k \qquad \text{formula (22)}$$

The correction coefficient storage unit 113 stores the correction coefficients h_c, h_m, h_y, and h_k. In the present exemplary embodiment, values of the correction coefficients h_c, h_m, h_y, and h_k are set to be 1 (one), but can be set to be an appropriate value other than 1 (one).

For example, it is useful to employ a method for printing monochromatic circular zone plate charts for respective CMYK color planes while varying the value of the correction coefficient and setting a correction coefficient corresponding to the chart capable of reducing the moiré most effectively.

Next, the subtraction unit 114 subtracts the corrected original moiré components P1_c, P1_m, P1_y, and P1_k from the color separated duty data D_c, D_m, D_y, and D_k, as defined by the following formulae (23) to (26). Thus, the original moiré component removing unit 111 can calculate and generate original moiré component removed duty data D1_c, D1_m, D1_y, and D1_k.

$$D1\_c = (D\_c - P1\_c) \qquad \text{formula (23)}$$

$$D1\_m = (D\_m - P1\_m) \qquad \text{formula (24)}$$

$$D1\_y = (D\_y - P1\_y) \qquad \text{formula (25)}$$

$$D1\_k = (D\_k - P1\_k) \qquad \text{formula (26)}$$

When the original moiré component removing unit 111 completes the above-described processing in step S204, the image processing apparatus 101 accomplishes the original moiré component removal processing according to the present exemplary embodiment.

Next, in step S205, the screen processing unit 115 performs AM screen processing on the original moiré component removed duty data D1_c, D1_m, D1_y, and D1_k. Thus, the screen processing unit 115 generates original moiré component removed screen processed data Out1_c, Out1_m, Out1_y, and Out1_k, and stores the generated data in the screen image storing buffer 116.

In the present exemplary embodiment, the threshold value table of each color used in the above-described processing is required to be identical to that used by the screen processing unit 107. Then, the original moiré component removed screen processed data stored in the screen image storing buffer 116 is output to the image forming apparatus 118 via the output terminal 117.

Figure 5:
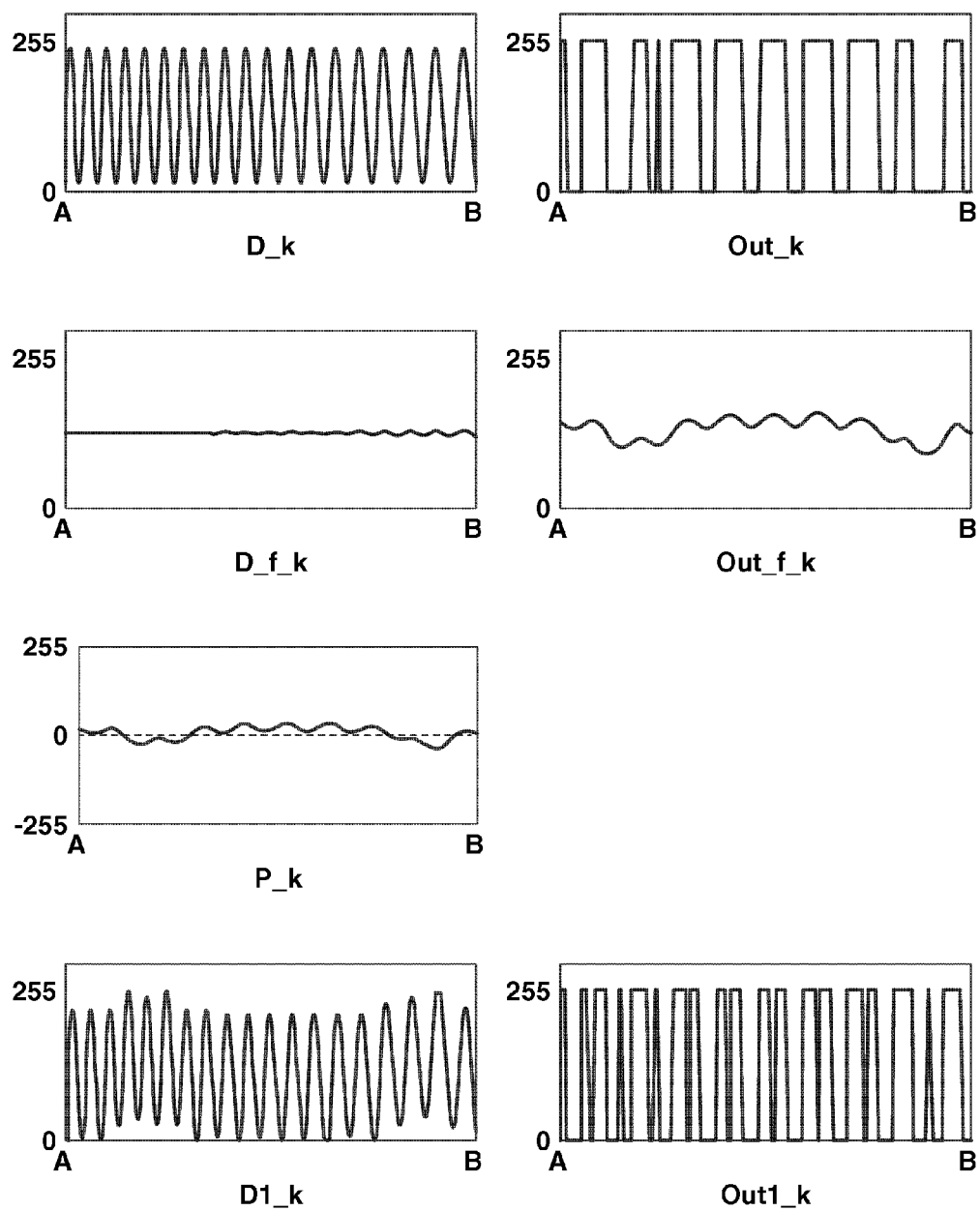
FIG. 5 illustrates example values of pixels arranged from a position A to a position B in the image illustrated in FIG. 4, and values at the position A to the position B with respect to an original moiré component that can be obtained in the processing for generating the image illustrated in FIG. 4.

Next, effects of the image processing method according to the present exemplary embodiment are described in detail blow with reference to FIG. 4 and FIG. 5. FIG. 4 illustrates black plane images generated when a black color circular zone plate chart having each side of approximately 5 mm is processed by the image processing apparatus 101 according to the present exemplary embodiment.

FIG. 4 illustrates the color separated duty data D_k output from the color separation processing unit 104, the screen processed data Out_k output from the screen processing unit 107, and the color separated duty low-frequency component D_f_k output from the filter processing unit 109.

FIG. 4 further illustrates the screen processed data low-frequency component Out_f_k output from the filter processing unit 108. The color separated duty low-frequency component D_f_k is image data that can be obtained by performing the filter processing on the color separated duty data D_k. The screen processed data low-frequency component Out_f_k is image data that can be obtained by performing the filter processing on the screen processed data Out_k.

FIG. 4 further illustrates the original moiré component removed duty data D1_k output from the original moiré component removing unit 111 and the original moiré component removed screen processed data Out1_k output from the screen processing unit 115.

In FIG. 4, the screen processed data Out_k is the image that can be obtained by performing the screen processing on the color separated duty data D_k. In FIG. 4, an original moiré in a region D_ can be visually recognized. On the other hand, the original moiré component removed screen processed data Out1_k is an image that can be obtained by performing the screen processing on the original moiré component removed duty data D1_k. Visually recognizing an original moiré in the original moiré component removed screen processed data Out1_k is difficult, compared to the original moiré in the screen processed data Out_k.

As described above, visually recognizing the original moiré in the original moiré component removed screen processed data Out1_k is difficult compared to that in the screen processed data Out_k. This principle can be intuitively understood based on a comparison between the region D of the screen processed data Out_k and the region D of the original moiré component removed duty data D1_k. More specifically, concentric original moiré can be visually recognized in the region D of the screen processed data Out_k. On the other hand, a reversed gradation pattern of the original moiré in the screen processed data Out_k can be visually recognized in the region D of the original moiré component removed duty data D1_k.

In other words, the original moiré component removed duty data D1_k can be regarded as a summation of the color separated duty data D_k and the gradation reversed original moiré pattern. Therefore, it is difficult to visually recognize the moiré in the original moiré component removed screen processed data Out1_k, i.e., the data obtained when the original moiré component removed duty data D1_k is subjected to the screen processing.

FIG. 5 illustrates example values of pixels arranged from a position A to a position B in the image illustrated in FIG. 4, and values at the position A to the position B with respect to the original moiré component P_k that can be obtained in the processing for generating the image illustrated in FIG. 4. Subtracting the color separated duty low-frequency component D_f_k from the screen processed data low-frequency component Out_f_k obtains the original moiré component P_k. Subtracting the original moiré component P_k from the color separated duty data D_k obtains the original moiré component removed duty data D1_k.

The color separated duty data D_k is a duty data to be reproduced. Therefore, it is desired that the screen processed data Out_k, i.e., the data obtained when the color separated duty data D_k is subjected to the screen processing, is similar to the color separated duty data D_k in shape. However, the screen processed data Out_k includes a moiré component generated due to the interference between the color separated duty data D_k and the screen. It is understood that the wave width of the screen processed data Out_k is greater than that of the color separated duty data D_k.

On the other hand, the wave width of the original moiré component removed screen processed data Out1_k does not increase compared to the color separated duty data D_k. It is understood that the original moiré component removed screen processed data Out1_k can correctly reproduce the shape of the color separated duty data D_k, compared to the screen processed data Out_k.

As described above, the present exemplary embodiment can reduce the original moiré that may be caused by the AM screen. Further, the present exemplary embodiment can prevent an input image from being blurred out (see Japanese Patent Application Laid-Open No. 08-051536) and can prevent an output image from having striking roughness (see Japanese Patent Application Laid-Open No. 2007-129558).

Next, a second exemplary embodiment is described in detail below. According to the method described in the first exemplary embodiment, the original moiré can be reduced using the AM screen having less noticeable roughness, without blurring out the input image.

In general, the screen processing performed in a color printing operation using the AM screen includes changing the halftone dot angles of CMYK coloring materials. More specifically, when a portion where halftone dots are overlapped and a portion where halftone dots are not overlapped are intentionally created between coloring materials, it becomes possible to prevent the tint from varying according to the color misregistration.

However, if the halftone dot angle is changed for each coloring material, the periods of halftone dots along the horizontal axis and the vertical axis for each coloring material varies correspondingly. Therefore, interference fringes may occur when the recording is performed by overlapping respective coloring materials. The interference fringes caused in this case are referred to as "inter-color moiré."

In the present exemplary embodiment, a method capable of reducing an inter-color moiré component in addition to the original moiré component is described in detail below. In the present exemplary embodiment, the inter-color moiré component is a moiré component between different color screens.

Figure 6B:
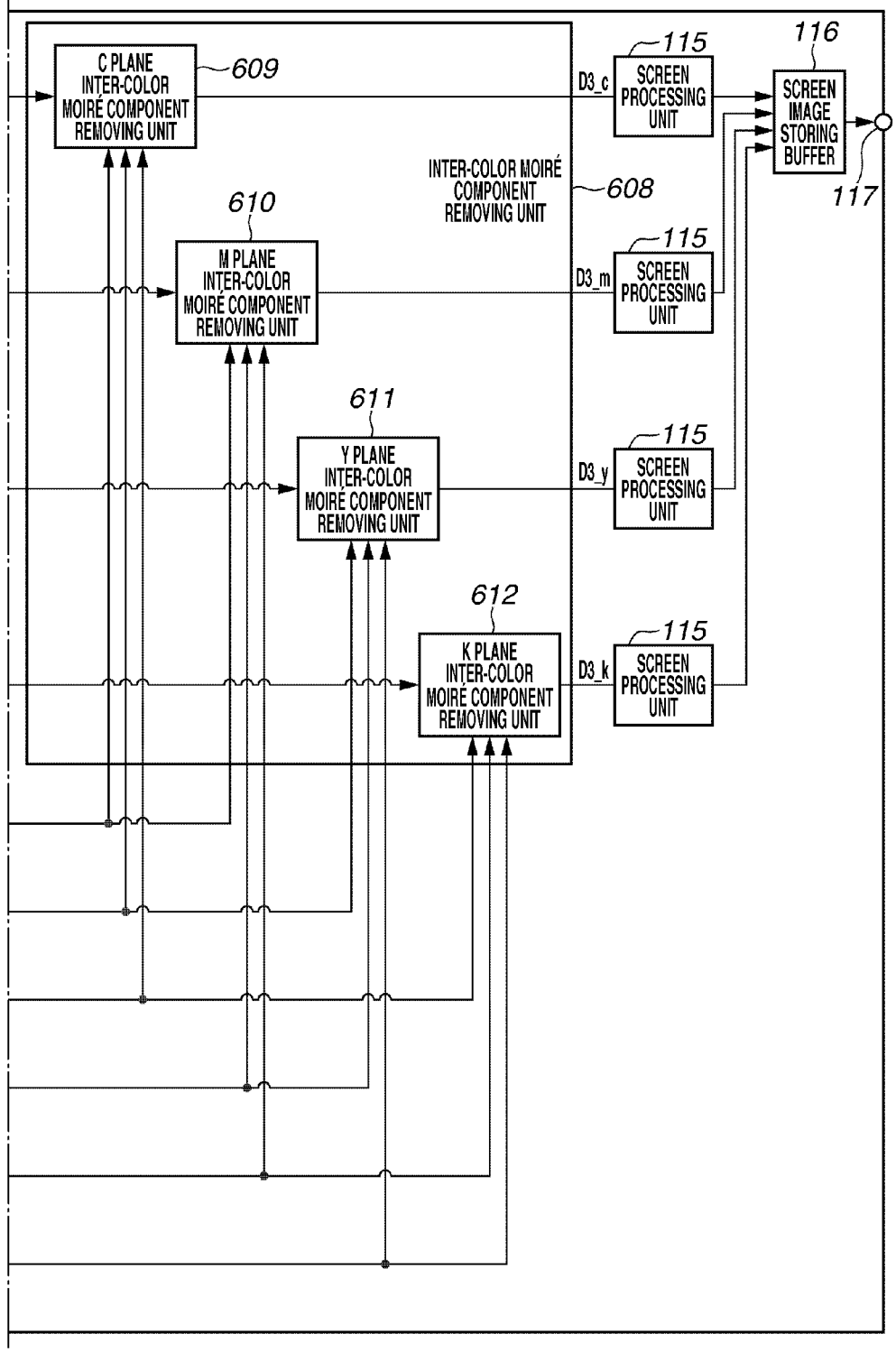
FIG. 6 (6A and 6B) is a block diagram illustrating a configuration of the image processing apparatus according to a second exemplary embodiment.
Figure 7:
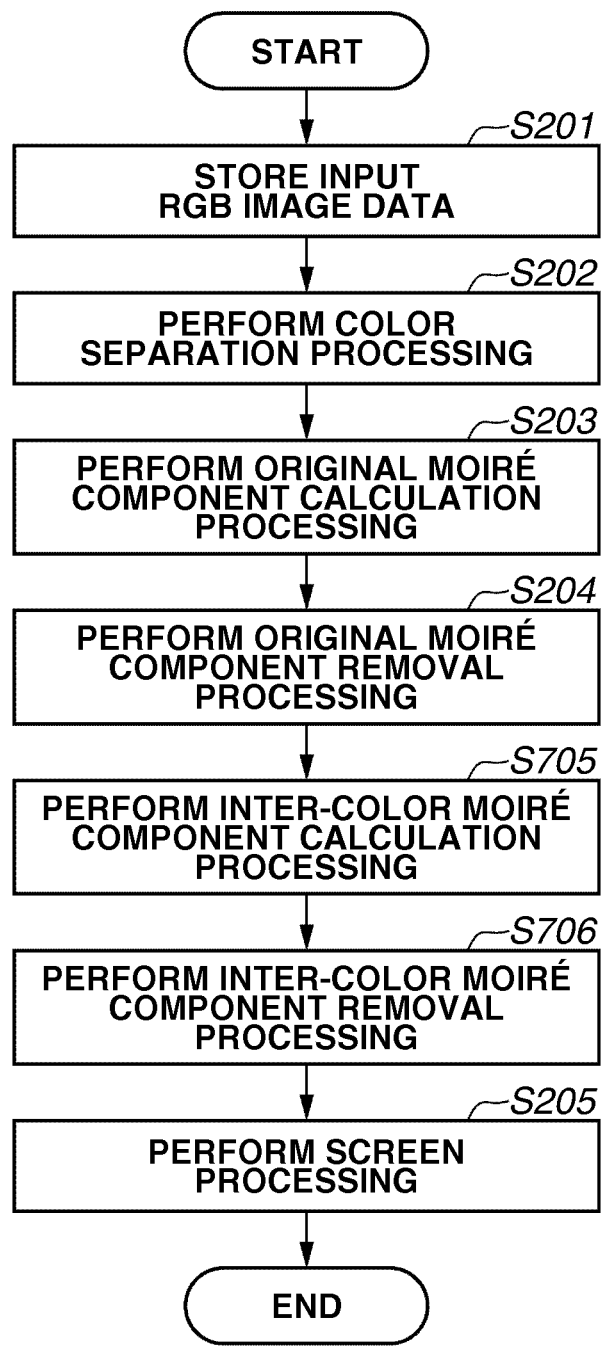
FIG. 7 is a flowchart illustrating an image processing method that can be implemented by the image processing apparatus according to the second exemplary embodiment.

FIG. 6 (6A and 6B) is a block diagram illustrating an example configuration of an image processing apparatus 201 according to the second exemplary embodiment. FIG. 7 is a flowchart illustrating an image processing method that can be implemented by the image processing apparatus 201 according to the second exemplary embodiment. Processing to be performed in steps S201 to S205 illustrated in FIG. 7 are similar to the processing of steps S201 to S205 described in the first exemplary embodiment, and therefore the description thereof is not repeated. Further, the image processing apparatus 201 according to the present exemplary embodiment is connected to the image forming apparatus 118 illustrated in FIG. 1, although not illustrated in FIG. 6.

Figure 8:
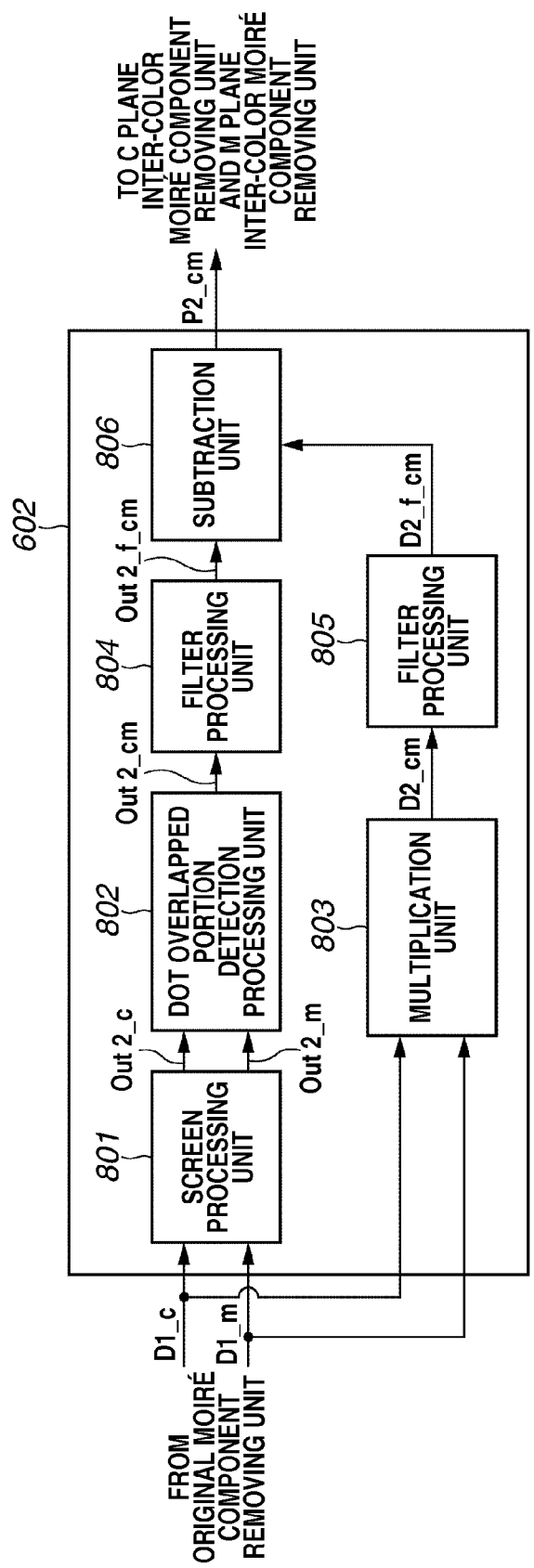
FIG. 8 is a block diagram illustrating an example configuration of a CM inter-color moiré component calculation unit according to the second exemplary embodiment.

In step S705, an inter-color moiré component calculation unit 601 illustrated in FIG. 6 calculates inter-color moiré components. Hereinafter, example processing that can be performed by the inter-color moiré component calculation unit 601 is described in detail below with reference to FIG. 6 and FIG. 8. FIG. 8 is a block diagram illustrating an example configuration of a CM inter-color moiré component calculation unit 602.

As illustrated in FIG. 6, the inter-color moiré component calculation unit 601 includes the CM inter-color moiré component calculation unit 602, a CY inter-color moiré component calculation unit 603, a CK inter-color moiré component calculation unit 604, an MY inter-color moiré component calculation unit 605, an MK inter-color moiré component calculation unit 606, and a YK inter-color moiré component calculation unit 607.

Data to be input to each of the CM inter-color moiré component calculation unit 602 to the YK inter-color moiré component calculation unit 607 is a combination of two color data, which are selected from the original moiré component removed duty data D1_c, D1_m, D1_y, and D1_k output from the original moiré component removing unit 111, illustrated in FIG. 6.

Each of the CM inter-color moiré component calculation unit 602 to the YK inter-color moiré component calculation unit 607 calculates an inter-color moiré component that may be generated between two colors based on the input original moiré component removed duty data of these two colors. These inter-color moiré component calculation units 602 to 607 are functionally similar to each other. Therefore, only the processing that can be performed by the CM inter-color moiré component calculation unit 602 is described below. The processing performed by each of the remaining inter-color moiré component calculation units 603 to 607 is similar to that of the CM inter-color moiré component calculation unit 602.

The CM inter-color moiré component calculation unit 602 includes a screen processing unit 801 configured to perform AM screen processing on the input original moiré component removed duty data D1_c and D1_m. The screen processing unit 801 generates screen processed data Out2_c and Out2_m. In the present exemplary embodiment, the threshold value table of each color used in the above-described processing is required to be identical to that used by the screen processing unit 107.

The CM inter-color moiré component calculation unit 602 further includes a dot overlapped portion detection processing unit 802 configured to generate dot overlapped portion data Out2_cm that represents a portion where dots of the screen processed data Out2_c and Out2_m are overlapped with each other, according to the following formula (27).

$$Out2\_cm = (Out2\_c/255) \times (Out2m/255) \times 255 \quad \text{formula (27)}$$

Similarly, a multiplication unit 803 generates a multiplied duty data D2_cm based on the original moiré component removed duty data D1_c and D1_m, according to the following formula (28).

$$D2\_cm = (D1\_c/255) \times (D1\_m/255) \times 255 \quad \text{formula (28)}$$

The CM inter-color moiré component calculation unit 602 further includes a filter processing unit 804 configured to perform filter processing using a predetermined low-pass filter LPF on the dot overlapped portion data Out2_cm, according to the following formula (29). Thus, the filter processing unit 804 can calculate and generate a dot overlapped portion data low-frequency component Out2_f_cm.

$$Out2\_f\_cm = Out2\_cm * LPF \quad \text{formula (29)}$$

In the formula (29), the mark * represents convolution.

Similarly, a filter processing unit 805 performs filter processing using a predetermined low-pass filter LPF on the multiplied duty data D2_cm, according to the following formula (30). Thus, the filter processing unit 805 can calculate and generate a multiplied duty data low-frequency component D2_f_cm.

$$D2\_f\_cm = D2\_cm * LPF \quad \text{formula (30)}$$

In the formula (30), the mark * represents convolution.

The CM inter-color moiré component calculation unit 602 further includes a subtraction unit 806 configured to subtract the multiplied duty data low-frequency component D2_f_cm from the dot overlapped portion data low-frequency component Out2_f_cm, as defined by the following formula (31). Thus, the subtraction unit 806 can calculate and generate an inter-color moiré component P2_cm. Through the above-described processing, the CM inter-color moiré component calculation unit 602 can accomplish its processing.

$$P2\_cm=(Out2\_f\_cm-D2\_f\_cm) \quad \text{formula (31)}$$

The CY inter-color moiré component calculation unit 603 to the YK inter-color moiré component calculation unit 607 can calculate inter-color moiré components P2_cy, P2_ck, P2_my, P2_mk, and P2_yk by performing processing similar to the above-described processing. Through the above-described processing, the inter-color moiré component calculation unit 601 can accomplish the inter-color moiré component calculation processing according to the present exemplary embodiment.

Next, in step S706, an inter-color moiré component removing unit 608 removes the inter-color moiré components. As illustrated in FIG. 6, the inter-color moiré component removing unit 608 includes a C plane inter-color moiré component removing unit 609, an M plane inter-color moiré component removing unit 610, a Y plane inter-color moiré component removing unit 611, and a K plane inter-color moiré component removing unit 612.

As illustrated in FIG. 6, data to be input to each of the C plane inter-color moiré component removing unit 609 to the K plane inter-color moiré component removing unit 612 is one-color data (i.e., one of the original moiré component removed duty data D1_c, D1_m, D1_y, and D1_k) and three inter-color moiré components corresponding to the one-color data.

Each of the C plane inter-color moiré component removing unit 609 to the K plane inter-color moiré component removing unit 612 subtracts the three inter-color moiré components corresponding to the one-color data from the input one-color original moiré component removed duty data. The C plane inter-color moiré component removing unit 609 to the K plane inter-color moiré component removing unit 612 are functionally similar to each other. Therefore, only the processing that can be performed by the C plane inter-color moiré component removing unit 609 is described below. The M plane inter-color moiré component removing unit 610 to the K plane inter-color moiré component removing unit 612 perform processing similar to that of the C plane inter-color moiré component removing unit 609.

Figure 9:
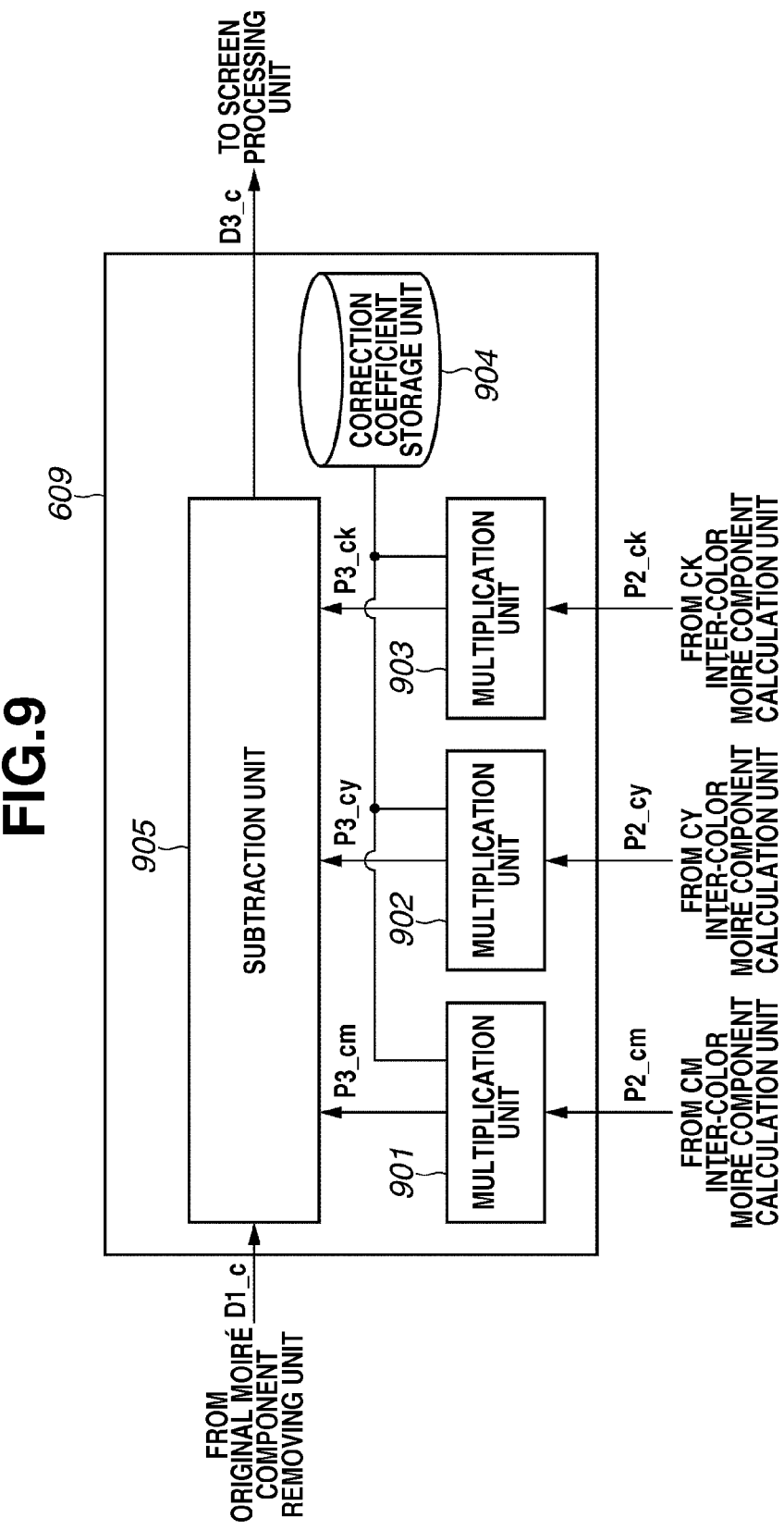
FIG. 9 is a block diagram illustrating an example configuration of a C plane inter-color moiré component removing unit according to the second exemplary embodiment.

FIG. 9 is a block diagram illustrating an example configuration of the C plane inter-color moiré component removing unit 609. As illustrated in FIG. 9, the C plane inter-color moiré component removing unit 609 includes three multiplication units 901, 902, and 903 that multiply their input inter-color moiré components P2_cm, P2_cy, and P2_ck by corresponding correction coefficients h_cm, h_cy, and h_ck, as defined by the following formulae (32) to (34). Thus, the multiplication units 901, 902, and 903 can generate corrected inter-color moiré components P3_cm, P3_cy, and P3_ck.

$$P3\_cm=h\_cm \times P2\_cm \quad \text{formula (32)}$$

$$P3\_cy=h\_cy \times P2\_cy \quad \text{formula (33)}$$

$$P3\_ck=h\_ck \times P2\_ck \quad \text{formula (34)}$$

The C plane inter-color moiré component removing unit 609 further includes a correction coefficient storage unit 904 that stores the correction coefficients h_cm, h_cy, and h_ck.

Setting values of the correction coefficients can be determined beforehand based on a patch measurement result. For example, it is useful to print a plurality of patches differentiated in correction coefficient for each color plane set, perform moiré detection processing on the printed patches, and set a correction coefficient that corresponds to the patch capable of reducing the moiré most effectively.

Further, the setting of the correction coefficients can be performed in such a way as to reduce a color difference between a portion where dots are overlapped with each other (i.e., a superimposed portion) and a portion where no dots are overlapped with each other (i.e., a non-superimposed portion). Further, the setting of the correction coefficients can be performed in such a way as to reduce a luminance difference because the luminance greatly influences the appearance of the inter-color moiré.

In this case, if the luminance of a superimposed portion becomes lower when coloring materials are combined, a positive correction coefficient is used to increase the luminance of the superimposed portion. To the contrary, if the luminance of the superimposed portion becomes higher, a negative correction coefficient is used to reduce the luminance of the superimposed portion.

Moreover, at least one of luminance, lightness, and chromaticity can be used. Further, it is useful to change the correction coefficients h_cm, h_cy, and h_ck for each location according to the values of the original moiré component removed duty data D1_c, D1_m, D1_y, and D1_k.

Further, instead of storing the correction coefficients in the correction coefficient storage unit 904 beforehand, the correction coefficients can be set based on sensor measurement values or can be set manually.

The C plane inter-color moiré component removing unit 609 further includes a subtraction unit 905 that subtracts the corrected inter-color moiré components P3_cm, P3_cy, and P3_ck from the original moiré component removed duty data D1_c, as defined by the following formula (35). Thus, the subtraction unit 905 can generate inter-color moiré component removed duty data D3_c. Through the above-described processing, the C plane inter-color moiré component removing unit 609 can accomplish its processing.

$$D3\_c=D1\_c-P3\_cm-P3\_cy-P3\_ck \quad \text{formula (35)}$$

Each of the M plane inter-color moiré component removing unit 610 to the K plane inter-color moiré component removing unit 612 performs processing similar to the above-described processing to calculate and generate inter-color moiré component removed duty data D3_m, D3_y, and D3_k. Accordingly, the inter-color moiré component removing unit 608 can accomplish the inter-color moiré component removal processing according to the present exemplary embodiment.

Similar to the first exemplary embodiment, the inter-color moiré component removed duty data is subsequently subjected to the screen processing (see step S205) and output to the image forming apparatus 118. In the present exemplary embodiment, the threshold value table of each color used in the screen processing of step S205 is required to be identical to that used by the screen processing unit 107.

As described above, similar to the first exemplary embodiment, the present exemplary embodiment can reduce the original moiré, using the AM screen having less noticeable roughness, without blurring out the input image. Further, the present exemplary embodiment can reduce the inter-color moiré in addition to the original moiré.

The above-described inter-color moiré component calculation unit 601 is an application example of a second calculation unit. The above-described inter-color moiré component removing unit 608 is an application example of an application example of a second correction unit.

Next, a third exemplary embodiment is described in detail below. In the above-described second exemplary embodiment, the method capable of reducing both the original moiré and the inter-color moiré by removing the inter-color moiré component after the original moiré component is removed has been described.

The present exemplary embodiment is opposite to the second exemplary embodiment in the processing order, according to which the original moiré component is removed after the inter-color moiré component is removed, although both the original moiré and the inter-color moiré can be reduced similarly in each of the second and third exemplary embodiments.

Figure 10:
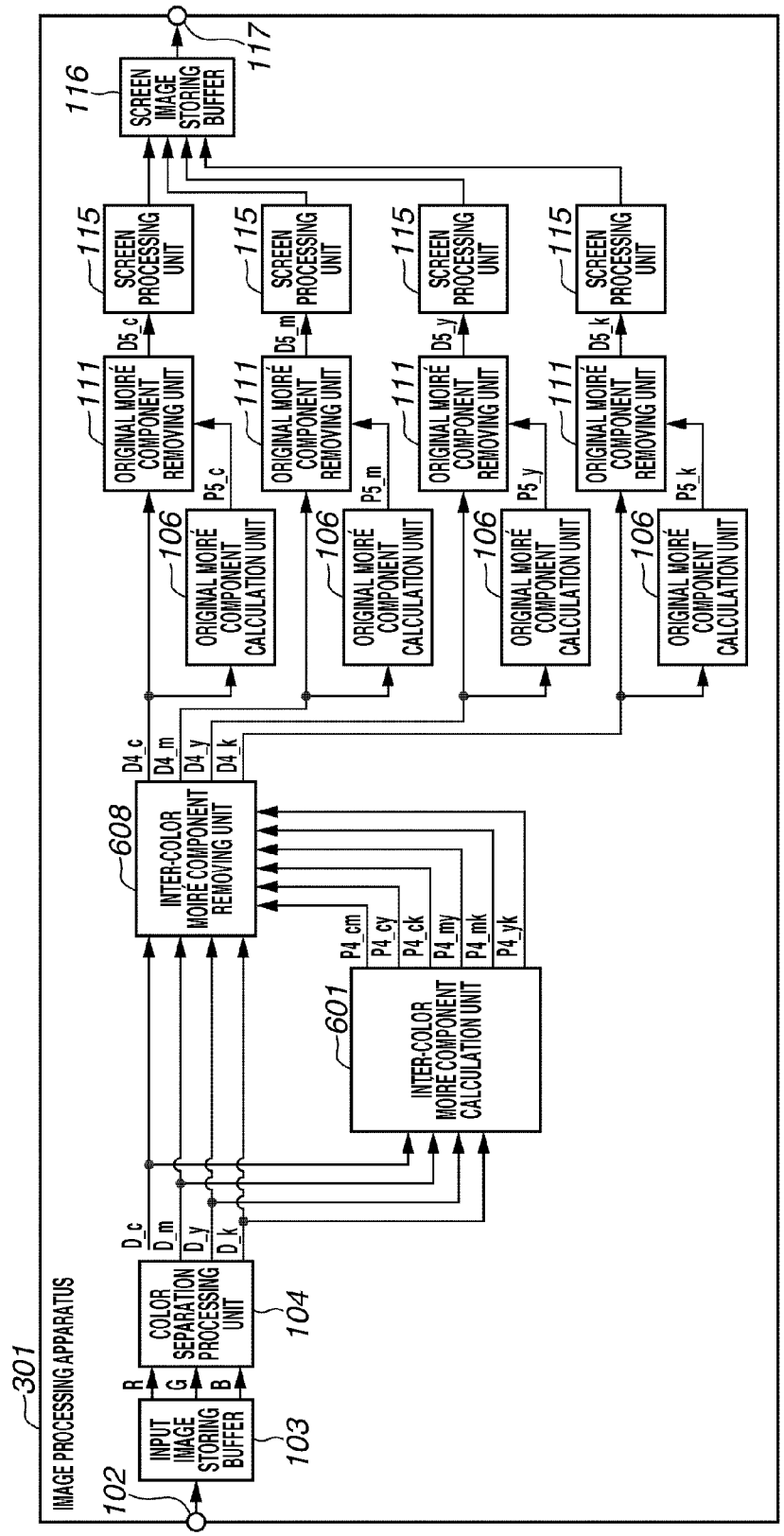
FIG. 10 is a block diagram illustrating an example configuration of an image processing apparatus according to a third exemplary embodiment.

FIG. 10 is a block diagram illustrating an example configuration of an image processing apparatus 301 according to the third exemplary embodiment. The image processing apparatus 301 illustrated in FIG. 10 includes an inter-color moiré component calculation unit 601 and an inter-color moiré component removing unit 608, whose detailed configurations are similar to those of the inter-color moiré component calculation unit 601 and the inter-color moiré component removing unit 608 illustrated in FIG. 6. Further, the image processing apparatus 301 according to the present exemplary embodiment is connected to the image forming apparatus 118 illustrated in FIG. 1, although not illustrated in FIG. 10.

Figure 11:
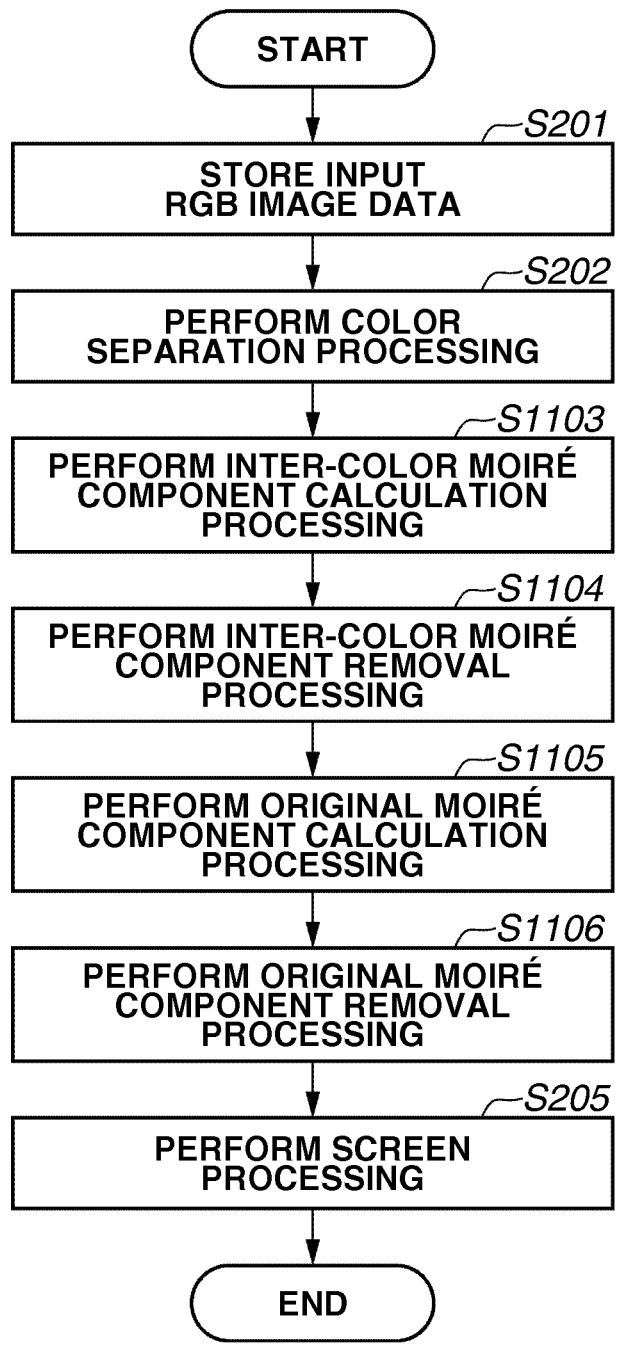
FIG. 11 is a flowchart illustrating an image processing method that can be implemented by the image processing apparatus according to the third exemplary embodiment.

FIG. 11 is a flowchart illustrating an image processing method that can be implemented by the image processing apparatus 301 according to the third exemplary embodiment. The image processing method according to the third exemplary embodiment is different from the image processing method according to the second exemplary embodiment (see FIG. 7) in the processing order of the above-described various processing. More specifically, the image processing apparatus 301 prioritizes the inter-color moiré component calculation processing and the inter-color moiré component removal processing over the original moiré component calculation processing and the original moiré component removal processing.

Hereinafter, example processing to be performed after completing the color separation processing according to the third exemplary embodiment is described in detail below with reference to FIG. 10 and FIG. 11. Color separation processing (to be performed in steps S201 and S202) is similar to the processing described in the second exemplary embodiment, and therefore the description thereof is not repeated.

First, in step S1103, the inter-color moiré component calculation unit 601 calculates inter-color moiré components P4_cm, P4_cy, P4_ck, P4_my, P4_mk, and P4_yk based on the color separated duty data D_c, D_m, D_y, and D_k. Next, in step S1104, the inter-color moiré component removing unit 608 generates inter-color moiré component removed duty data D4_c, D4_m, D4_y, and D4_k by removing the inter-color moiré components from the corresponding color separated duty data.

Next, in step S1105, the original moiré component calculation unit 106 calculates original moiré components P5_c, P5_m, P5_y, and P5_k based on the inter-color moiré component removed duty data. Next, in step S1106, the original moiré component removing unit 111 generates original moiré component removed duty data D5_c, D5_m, D5_y, and D5_k by removing the original moiré components from the inter-color moiré component removed duty data.

Next, in step S1107, the screen processing unit 115 performs screen processing on the original moiré component removed duty data. Thus, similar to the second exemplary embodiment, the image processing apparatus 301 can obtain screen processed image data that can suppress both the original moiré and the inter-color moiré.

As described above, similar to the second exemplary embodiment, the present exemplary embodiment can reduce the original moiré, using the AM screen having less noticeable roughness, without blurring out the input image. Further, the present exemplary embodiment can reduce the inter-color moiré in addition to the original moiré.

Next, a fourth exemplary embodiment is described in detail below. The processing order in the third exemplary embodiment is different from the processing order in the second exemplary embodiment, although the original moiré and the inter-color moiré can be reduced in each of the second and third exemplary embodiments. In the present exemplary embodiment, the processing order is further changed so that both the original moiré and the inter-color moiré can be reduced similarly.

Figures 12, 12A:
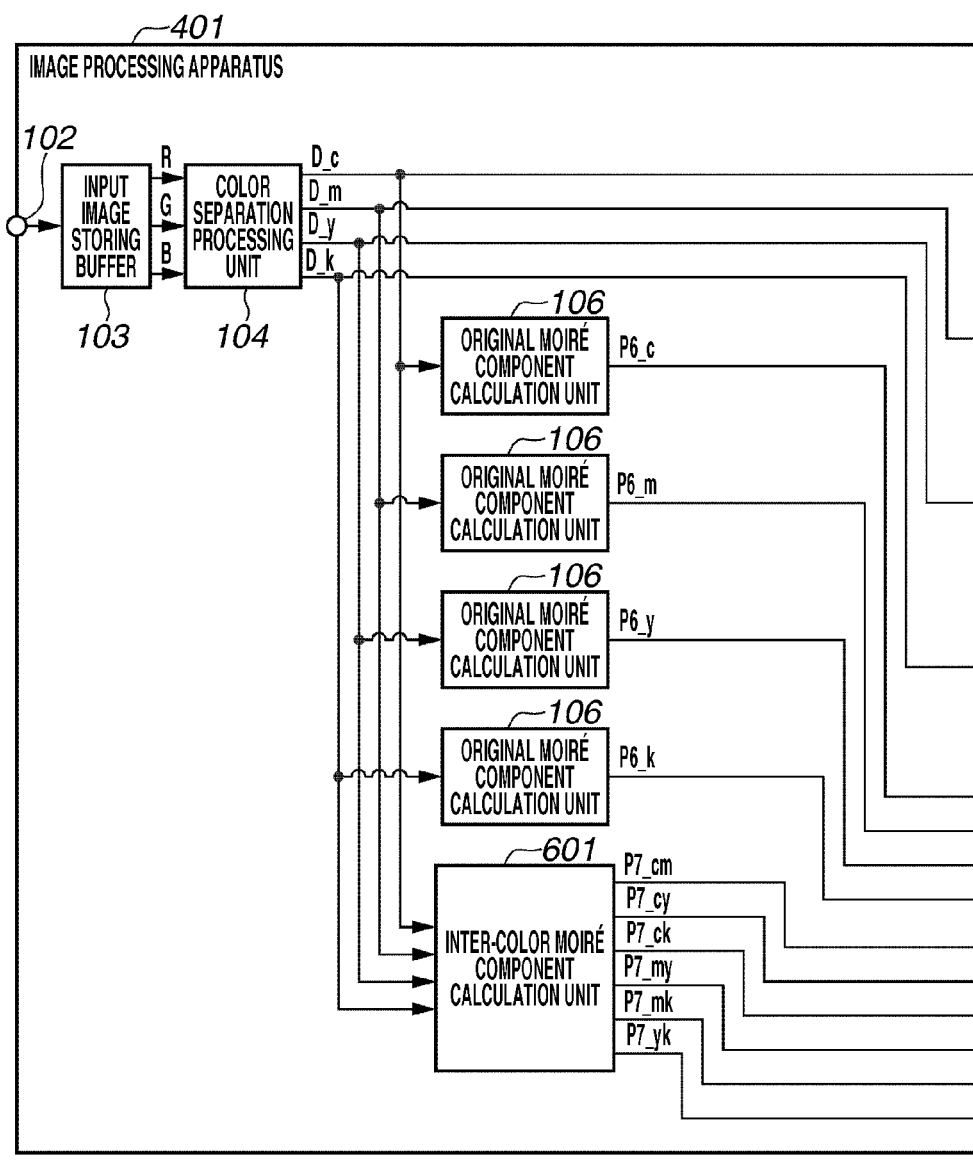
FIG. 12 (12A and 12B) is a block diagram illustrating an example configuration of an image processing apparatus according to a fourth exemplary embodiment.
Figure 12B:
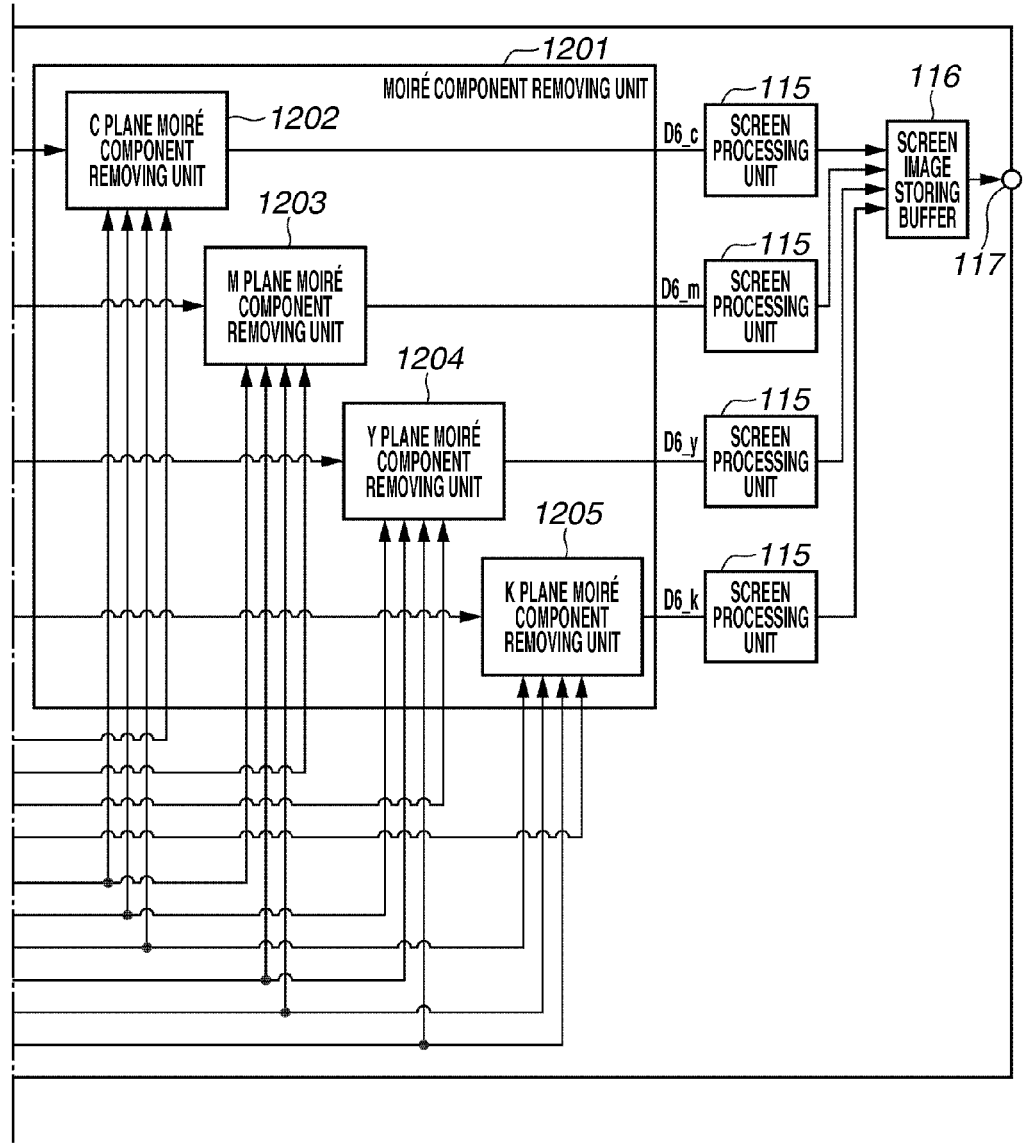
Figure 13:
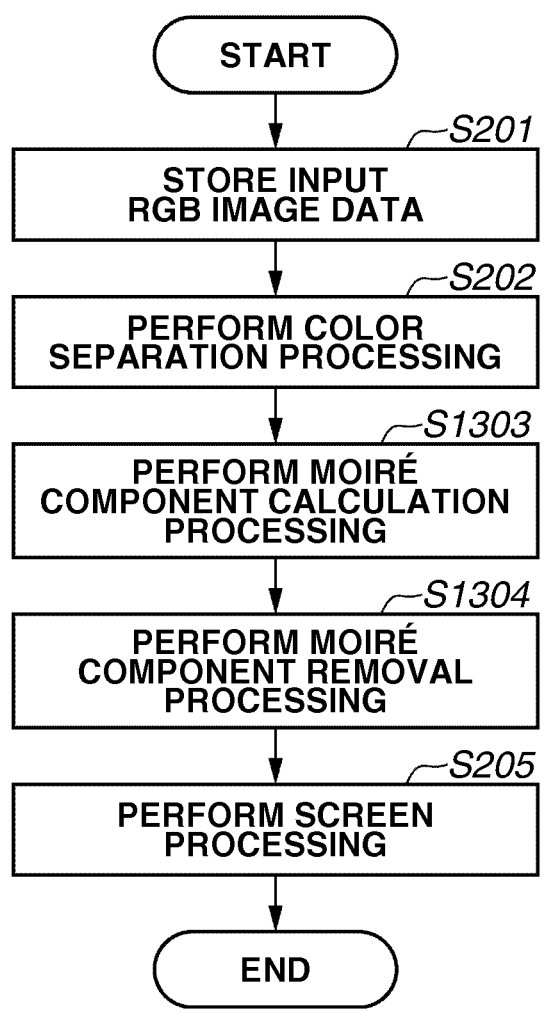
FIG. 13 is a flowchart illustrating an image processing method that can be implemented by the image processing apparatus according to the fourth exemplary embodiment.

FIG. 12 (12A and 12B) is a block diagram illustrating an example configuration of an image processing apparatus 401 according to the fourth exemplary embodiment. FIG. 13 is a flowchart illustrating an image processing method that can be implemented by the image processing apparatus 401 according to the present exemplary embodiment. An image processing method that can be implemented by the image processing apparatus 401 according to the present exemplary embodiment is described in detail below with reference to FIG. 12 and FIG. 13.

Processing to be performed in steps S201, S202, and S205 illustrated in FIG. 13 is similar to the processing of steps S201, S202, and S205 described in the first to third exemplary embodiments. Further, the image processing apparatus 401 according to the present exemplary embodiment is connected to the image forming apparatus 118 illustrated in FIG. 1, although not illustrated in FIG. 12.

First, in step S1303, the original moiré component calculation unit 106 calculates original moiré components D6_c, D6_m, D6_y, and D6_k based on the color separated duty data D_c, D_m, D_y, and D_k. Further, the inter-color moiré component calculation unit 601 calculates inter-color moiré components P7_cm, P7_cy, P7_ck, P7_my, P7_mk, and P7_yk based on the color separated duty data.

The original moiré component calculation processing and the inter-color moiré component calculation processing, i.e., the processing to be performed in step S1303, can be simultaneously or separately performed by the above-described functional units.

Next, in step S1304, the moiré component removing unit 1201 removes the original moiré components and the inter-color moiré components from the color separated duty data. As illustrated in FIG. 12, the moiré component removing unit 1201 includes a C plane moiré component removing unit 1202, an M plane moiré component removing unit 1203, a Y plane moiré component removing unit 1204, and a K plane moiré component removing unit 1205.

As illustrated in FIG. 12, data to be input to each of the C plane moiré component removing unit 1202 to the K plane moiré component removing unit 1205 is one-color data (i.e., one of the color separated duty data D_c, D_m, D_y, and D_k, three inter-color moiré components corresponding to the one-color data, and one original moiré component.

Each of the C plane moiré component removing unit 1202 to the K plane moiré component removing unit 1205 subtracts the three inter-color moiré components corresponding to the one-color data and the one original moiré component from the input one-color color separated duty data. The C plane moiré component removing unit 1202 to the K plane moiré component removing unit 1205 are functionally similar to each other. Therefore, only the processing that can be performed by the C plane moiré component removing unit 1202 is described below with reference to FIG. 14. The M plane moiré component removing unit 1203 to the K plane moiré component removing unit 1205 perform processing similar to that of the C plane moiré component removing unit 1202.

Figure 14:
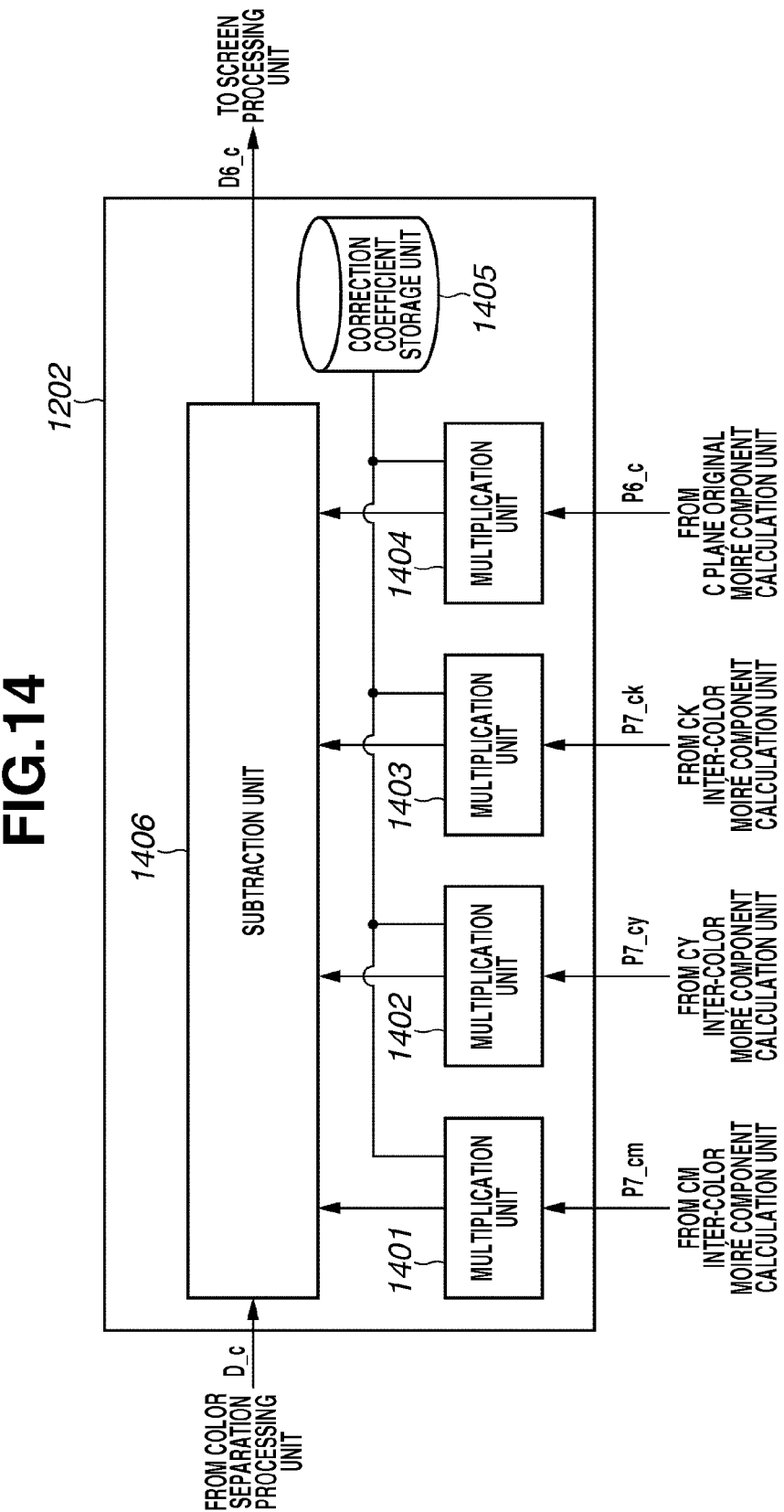
FIG. 14 is a block diagram illustrating an example configuration of a C plane moiré component removing unit according to the fourth exemplary embodiment.

FIG. 14 is a block diagram illustrating an example configuration of the C plane moiré component removing unit 1202. As illustrated in FIG. 14, the C plane moiré component removing unit 1202 includes four multiplication units 1401 to 1404 that multiply the moiré components P7_cm, P7_cy, P7_ck, and P6_c by correction coefficients h1_cm, h1_cy, h1_ck, and h1_c, as defined by the following formulae (36) to (39). Thus, the multiplication units 1401 to 1404 can generate corrected moiré components P9_cm, P9_cy, P9_ck, and P8_c.

$$P9\_cm = h1\_cm \times P7\_cm \quad \text{formula (36)}$$

$$P9\_cy = h1\_cy \times P7\_cy \quad \text{formula (37)}$$

$$P9\_ck = h1\_ck \times P7\_ck \quad \text{formula (38)}$$

$$P8\_c = h1\_c \times P6\_c \quad \text{formula (39)}$$

The C plane moiré component removing unit 1202 further includes a correction coefficient storage unit 1405 that stores the correction coefficients h1_cm, h1_cy, h1_ck, and h1_c. Numerical values of the correction coefficients can be set according to any one of the methods described in the first and second exemplary embodiments.

The C plane moiré component removing unit 1202 further includes a subtraction unit 1406 that subtracts the corrected moiré components P9_cm, P9_cy, P9_ck, and P8_c from the color separated duty data D_c, as defined by the following formula (40). Thus, the subtraction unit 1406 can calculate and generate moiré component removed duty data D6_c. Through the above-described processing, the C plane moiré component removing unit 1202 can accomplish its processing.

$$D6\_c = D\_c - P9\_cm - P9\_cy - P9\_ck - P8\_c \quad \text{formula (40)}$$

Each of the M plane moiré component removing unit 1203 to the K plane moiré component removing unit 1205 performs processing similar to the above-described processing to calculate and generate moiré component removed duty data D6_m, D6_y, and D6_k. Thus, the moiré component removing unit 1201 can accomplish the moiré component removal processing according to the present exemplary embodiment. Similar to the first to third exemplary embodiments, the moiré component removed duty data is subsequently subjected to the screen processing (see step S205) and output to the image forming apparatus 118.

As described above, similar to the third exemplary embodiment, the present exemplary embodiment can reduce the original moiré, using the AM screen having less noticeable roughness, without blurring out the input image. Further, the present exemplary embodiment can reduce the inter-color moiré in addition to the original moiré.

Next, a fifth exemplary embodiment is described. In the above-described exemplary embodiments, the same filter is used in the filter processing, regardless of image features, to calculate an original moiré component. An example method capable of switching the filter according to image features, such as a thin line or an edge, is described in the fifth exemplary embodiment. Constituent components similar to those described in the above-described exemplary embodiments are denoted by the same reference numerals and the descriptions thereof are not repeated.

Figure 15:
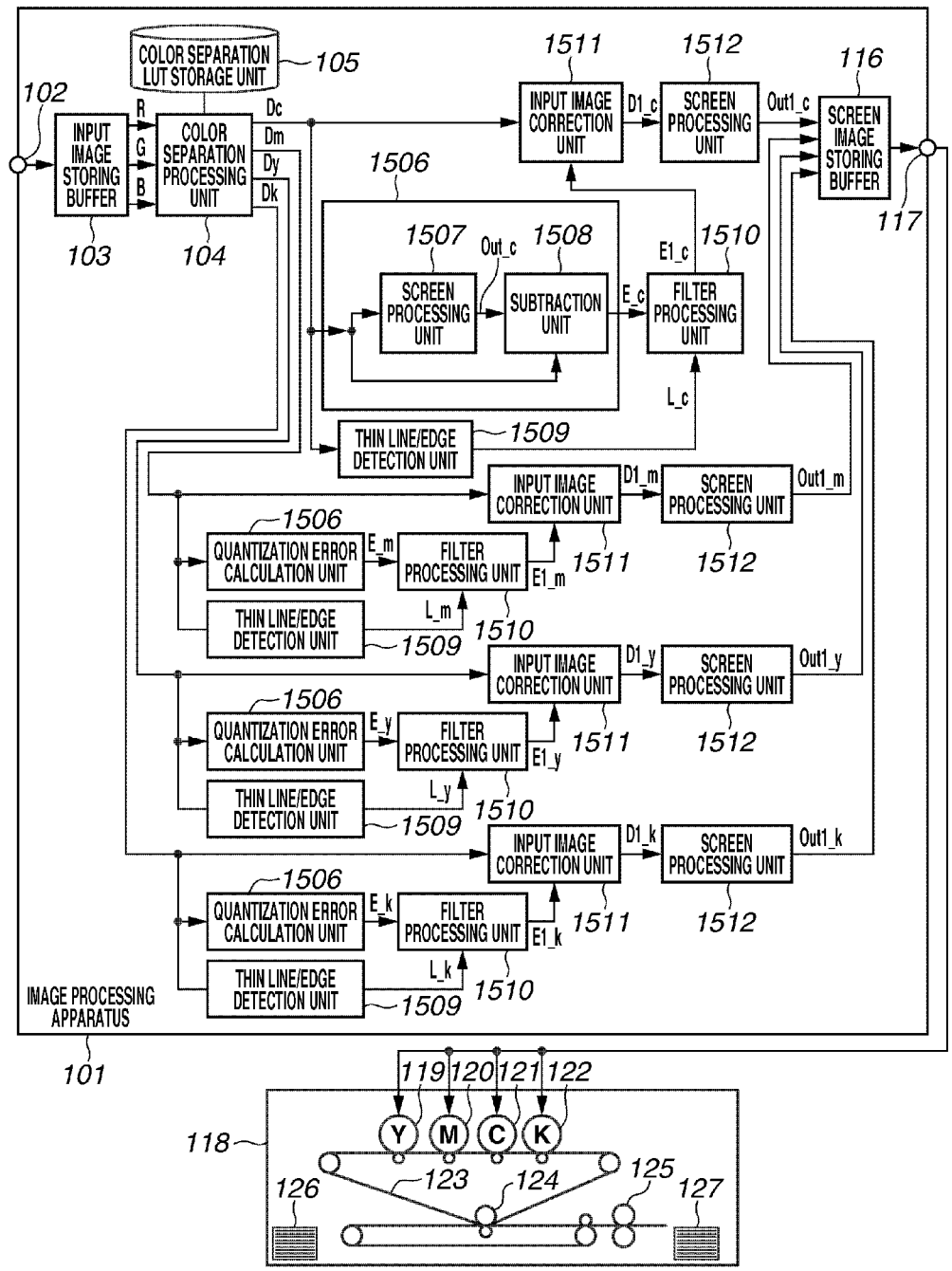
FIG. 15 is a block diagram illustrating an example configuration of an image processing apparatus and an image forming apparatus according to a fifth exemplary embodiment.

FIG. 15 is a block diagram illustrating an example configuration of an image processing apparatus and an image forming apparatus according to the fifth exemplary embodiment.

A quantization error calculation unit 1506 includes a screen processing unit 1507 and a subtraction unit 1508. Similar to the screen processing unit 1507 or the screen processing unit 115, the screen processing unit 1507 is configured to perform screen processing on each color component data separated by the color separation processing unit 104. The subtraction unit 1508 is configured to calculate a quantization error caused by the screen processing based on a difference between a processing result obtained by the screen processing unit 1507 and the input color component data.

A thin line/edge detection unit 1509 is configured to detect a thin line or an edge contained in each color component data separated by the color separation processing unit 104.

A filter processing unit 1510 is configured to perform filter processing on the quantization error output from the quantization error calculation unit 1506. The filter processing unit 1510 includes two filters 1701 and 1702 illustrated in FIG. 17. The filter processing unit 1510 selects the filter to be used in the filter processing according to an output of the thin line/edge detection unit 1509.

An input image correction unit 1511 is configured to subtract the value output from the filter processing unit 1510 from each color component data output from the color separation processing unit 104. A screen processing unit 1512 is configured to perform screen processing on the color component data corrected by the input image correction unit 1511 and stores the screen processed data in the screen image storing buffer 116. The screen processed data stored in the screen image storing buffer 116 can be output to the image forming apparatus 118 via an output terminal 117.

Figure 16:
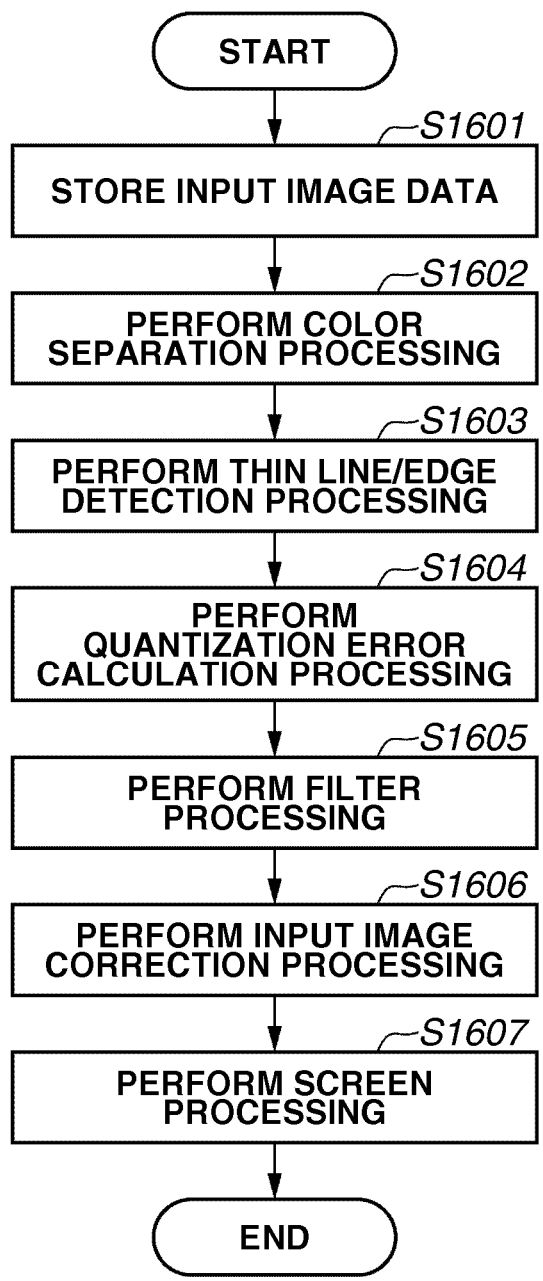
FIG. 16 is a flowchart illustrating an image processing method that can be implemented by the image processing apparatus according to the fifth exemplary embodiment.

Next, example image processing according to the present exemplary embodiment is described below with reference to a flowchart illustrated in FIG. 16.

Similar to step S201, in step S1601, the input image storing buffer 103 stores input image data. Similar to step S202, in step S1602, the color separation processing unit 104 performs color separation processing on the stored image data.

Next, in step S1603, the thin line/edge detection unit 1509 identifies a thin line/edge region in each of the color separated duty data D_c, D_m, D_y, and D_k. For example, the thin line/edge detection unit 1509 uses a Laplacian filter or a LOG filter to perform the thin line/edge determination, where a Laplacian of Gaussian, or LoG filtering includes a convolution masks that yields high-spatial-frequency pass filtration which provides an omnidirectional edge enhancement.

Further, instead of identifying the thin line/edge region based on image data, it is useful to identify the thin line/edge region based on attribute information of input image data. Further, it is useful to use both an image analysis result and the attribute information. Any other appropriate determination method can be employed to identify the thin line/edge region.

Next, in step S1604, the quantization error calculation unit 1506 calculates a quantization error. Hereinafter, example processing that can be performed by the quantization error calculation unit 1506 is described in detail below with reference to FIG. 15.

The quantization error calculation unit 1506 includes the screen processing unit 1507 and the subtraction unit 1508. For a purpose of simplifying the description, FIG. 15 illustrates a detailed arrangement of the quantization error calculation unit 1506 only for the cyan color. The quantization error calculation unit 1506 provided for each of the remaining colors has a similar arrangement.

The screen processing unit 1507 performs screen processing on the color separated duty data D_c, D_m, D_y, and D_k generated by the color separation processing unit 104. The screen processing unit 1507 outputs screen processed data Out_c, Out_m, Out_y, and Out_k.

Next, the subtraction unit 1508 calculates a difference between the screen processed data Out_c, Out_m, Out_y, and Out_k and the color separated duty data D_c, D_m, D_y, and D_k, as defined by the following formulae (40) to (41). Namely, the subtraction unit 1508 calculates quantization errors E_c, E_m, E_y, and E_k.

$$E\_c = Out\_c - D\_c \quad \text{formula (40)}$$

$$E\_m = Out\_m - D\_m \quad \text{formula (41)}$$

$$E\_y = Out\_y - D\_y \quad \text{formula (42)}$$

$$E\_k = Out\_k - D\_k \quad \text{formula (43)}$$

Through the above-described processing, the quantization error calculation unit 1506 can accomplish the quantization error calculation processing according to the present exemplary embodiment.

Next, in step S1605, the filter processing unit 1510 performs filter processing on the quantization errors E_c, E_m, E_y, and E_k, as defined by the following formulae (44) to (47) to calculate filter processed quantization errors E1_c, E1_m, E1_y, and E1_k. In the following formulae, F represents a filter coefficient.

$$E1\_c = E\_c * F \quad \text{formula (44)}$$

$$E1\_m = E\_m * F \quad \text{formula (45)}$$

$$E1\_y = E\_y * F \quad \text{formula (46)}$$

$$E1\_k = E\_k * F \quad \text{formula (47)}$$

In each of the formulae (44) to (47), the mark * represents convolution.

The filter processing unit according to the present exemplary embodiment includes two filters 1701 and 1702 that are differentiated in filter coefficient. Each of the filters 1701 and 1702 has a filter coefficient composed of 11 pixels×11 pixels and has low-pass characteristics.

The filter 1701 has a cutoff frequency that is lower than a screen frequency of the screen referred to by the screen processing unit 1507. If the filter 1701 is employed in the filter processing performed on the quantization error, it is possible to remove a frequency component of the quantization error that is equal to or greater than the screen frequency (i.e., the original moiré component). Therefore, it is possible to remove the frequency component that may cause moiré and detect a quantization error suitable for moiré correction.

On the other hand, the filter 1702 has a large cutoff frequency and passes almost all of the frequency components. If the filter 1702 is employed in the filter processing performed on the quantization error, the filter 1702 passes almost all of frequency components, including not only low-frequency components but also high-frequency components (i.e., frequency components in the region higher than the screen frequency). Therefore, it is possible to detect a quantization error suitable for thin line/edge correction. As described above, the filter processing unit 1510 can switch the filter applied to the quantization error according to the features of the image region and can detect quantization errors in different frequency bands.

More specifically, the filter processing unit 1510 selects the filter 1701 having the cutoff frequency that is adjacent to the screen frequency for each pixel that was not identified as the thin line/edge in step S1603. The filter processing unit 1510 uses the selected filter 1701 to perform filter processing on the quantization error.

Further, the filter processing unit 1510 selects the filter 1702 that passes not only low-frequency components but also high-frequency components of the quantization error for each pixel that was identified as the thin line/edge in step S1603. The filter processing unit 1510 uses the selected filter 1702 to perform filter processing on the quantization error.

In the formula (48), r represents the distance of the filter coefficient from the origin. Further, σ represents the Gaussian kernel, which is 2.5 in the case of the filter 1701 and 0.5 in the case of the filter 1702.

$$F = \frac{1}{2\pi\sigma^2}\exp\left(-\frac{r^2}{2\sigma^2}\right) \quad \text{formula (48)}$$

Through the above-described processing, the filter processing unit 1510 can accomplish the filter processing according to the present exemplary embodiment.

Next, in step S1606, the input image correction unit 1511 removes the filter processed quantization errors E1_c, E1_m, E1_y, and E1_k from the color separated duty data D_c, D_m, D_y, and D_k as defined by the following formulae (49) to (52).

In a region where pixels are not identified as an edge or a thin line, the input image correction unit 1511 performs correction based on the low-frequency component of the quantization error in such a way as to prevent new moiré from generating as a result that the quantization error is subtracted from the color separated duty data. Further, in a region where pixels are identified as an edge or a thin line, the input image correction unit 1511 subtracts the quantization error from the color separated duty data in such a way as to reduce the break or jaggy of a thin line without blurring out the quantization error.

$$D1\_c = D\_c - E1\_c \quad \text{formula (49)}$$

$$D1\_m = D\_m - E1\_m \quad \text{formula (50)}$$

$$D1\_y = D\_y - E1\_y \quad \text{formula (51)}$$

$$D1\_k = D\_k - E1\_k \quad \text{formula (52)}$$

Next, in step S1607, the screen processing unit 1512 performs screen processing on the quantization error removed duty data D1_c, D1_m, D1_y, and D1_k. Then, the screen processing unit 1512 stores the quantization error removed screen processed data Out1_c, Out1_m, Out1_y, and Out1_k in the screen image storing buffer 116.

The screen used in this case is required to be identical to the one used by the screen processing unit 1507. Then, the screen processed data stored in the screen image storing buffer 116 is output to the image forming apparatus 118 via the output terminal 117. Through the above-described processing, the image processing apparatus 101 thoroughly completes its processing.

In the present exemplary embodiment, the image processing apparatus 101 performs filter processing differentiated according to the image on the quantization error caused by the screen processing. The image processing apparatus 101 corrects the input image based on the filter processed quantization error. Then, the image processing apparatus 101 performs the screen processing on the corrected data. Effects of the processing according to the present exemplary embodiment are described below with reference to FIG. 18, FIG. 19, and FIG. 20.

Figure 18:
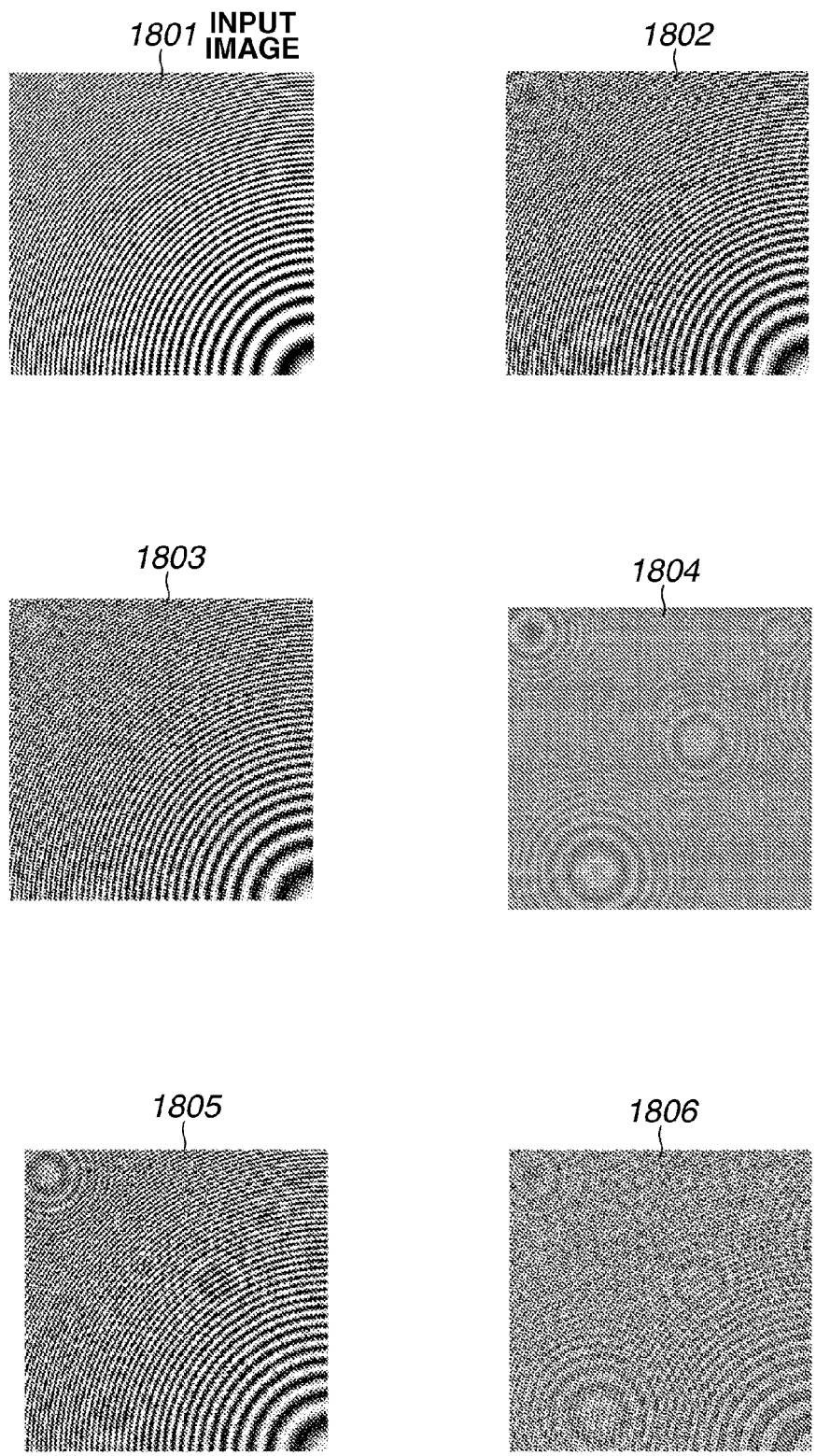
FIG. 18 illustrates images each including various frequency fringes, as practical examples that reveal effects obtainable according to the fifth exemplary embodiment.
Figure 20:
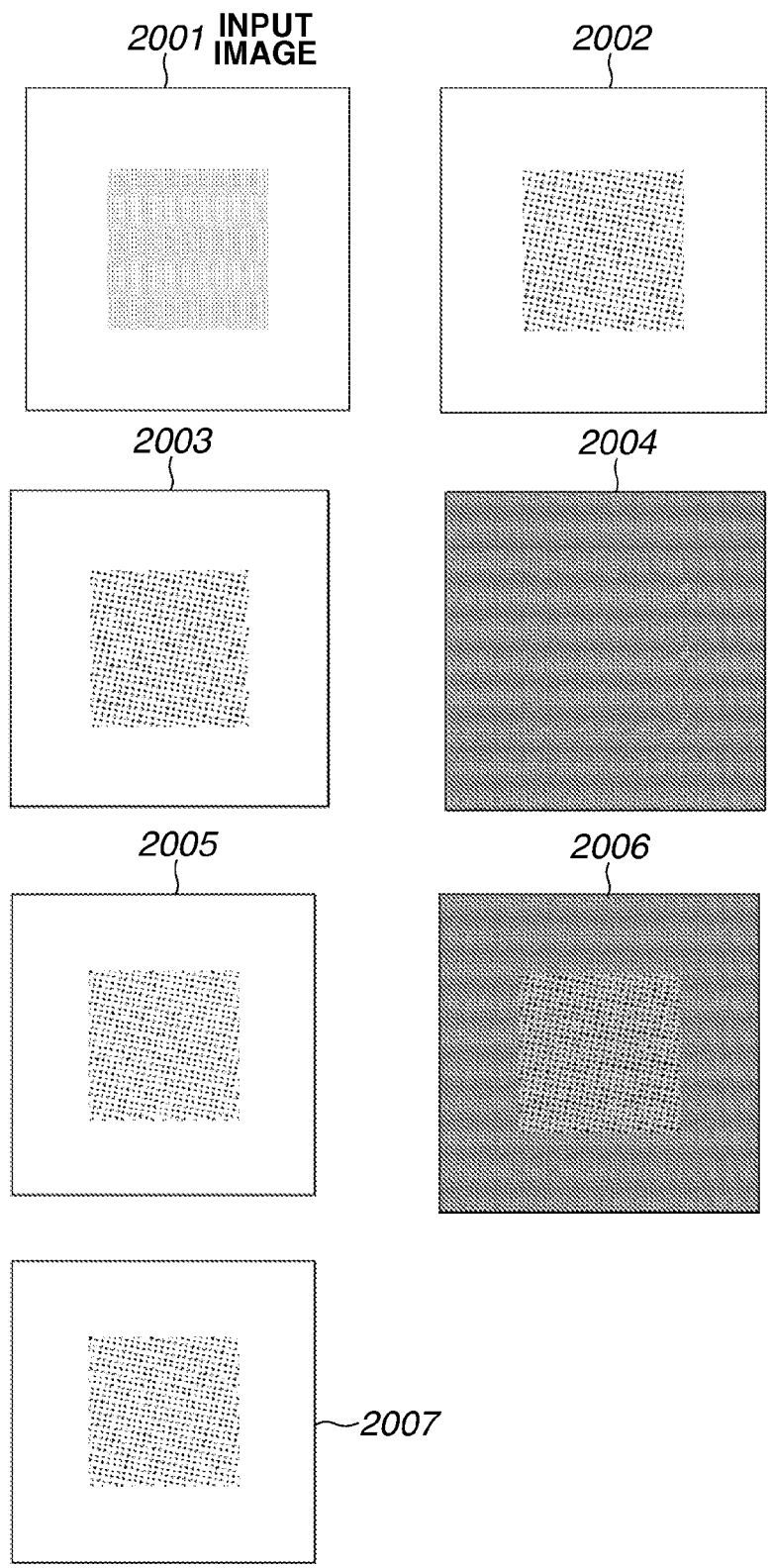
FIG. 20 illustrates images each including edges, as practical examples that reveal effects obtainable according to the fifth exemplary embodiment.

FIG. 18 illustrates images each including various frequency fringes. FIG. 19 illustrates images each including thin lines. FIG. 20 illustrates example results of processing executed on an image including edges according to the present exemplary embodiment. First, as illustrated in FIG. 18, if an input image 1801 including various frequency fringes is subjected to quantization processing without applying any correction, moiré occurs as understood from a processing result 1802.

Hence, a quantization error is calculated and the input image is corrected using a result of filter processing performed on the quantization error according to image features. A processing result 1803 is obtained when the filter processing unit uses the filter 1701.

In this case, if the input image 1801 is corrected using a low-frequency component 1804 of the quantization error and screen processing is performed on the corrected image, the processing result 1803 including almost no moiré can be obtained.

This is because, as described above, the correction can be performed in such a way as to prevent moiré from occurring even when the screen processing is performed using the low-frequency component (original moiré component) of the quantization error, and because the high-frequency component of the quantization error that may cause new moiré can be removed.

On the other hand, if filter processing using the filter 1702 having a large cutoff frequency is performed on a quantization error caused when the screen processing is performed on the same input image 1801, a low-frequency component 1806 of the quantization error can be obtained.

After the input image 1801 is corrected based on the low-frequency component 1806 of the quantization error, if screen processing is performed on the corrected image, a processing result 1805 can be obtained. As apparent from the processing result 1805, the moiré cannot be reduced. Further, the low-frequency component 1806 of the quantization error includes higher-region components because the filter 1702 passes frequency components in the higher region in addition to the low-frequency components. Therefore, new moiré occurs.

In the present exemplary embodiment, the image processing apparatus 101 performs filter processing using the filter 1701 having the cutoff frequency lower than the screen frequency on the input image 1801 that does not include any thin line/edge region. As a result of the filter processing, the processing result 1803 can be obtained.

As described above, when the input image 1801 including various frequency fringes other than a thin line/edge portion is subjected to the screen processing, the image processing apparatus according to the present exemplary embodiment can correct the input image based on an appropriately detected low-frequency component (i.e., the original moiré component) of the quantization error and can obtain an output image having higher reproducibility.

Next, as illustrated in FIG. 19, if an input image 1901 including thin lines is subjected to quantization processing without applying any correction, noticeable break of a thin line occurs as understood from a processing result 1902.

Hence, a quantization error is calculated and the input image is corrected using a result of filter processing performed on the quantization error according to image features. A low-frequency component 1904 of the quantization error is a result of processing performed on a quantization error of each pixel identified as a thin line, which can be obtained using the filter 1701 having a cutoff frequency equal to or lower than the screen frequency.

If the input image 901 is corrected using the low-frequency component 1904 of the quantization error and screen processing is performed on the corrected image, a processing result 1903 can be obtained. If the input image is the image 1901 including thin lines and the filter processing unit 1510 uses the filter 1701, the quantization error is excessively blurred out and sufficient correction effects cannot be obtained. The break of each thin line cannot be improved.

On the other hand, if filter processing using the filter 1702 having a large cutoff frequency is performed on the quantization error caused when the screen processing is performed on the input image 1901, a low-frequency component 1906 of the quantization error can be obtained.

After the input image 1901 is corrected based on the low-frequency component 1906 of the quantization error, if screen processing is performed on the corrected image, a processing result 1905 can be obtained. The processing result 1905 reveals that the pixel where the break of a thin line occurs can be corrected sufficiently based on the quantization error and accordingly the striking break of the thin line decreases.

In the present exemplary embodiment, the image processing apparatus 101 performs filter processing using the filter 1702 having a large cutoff frequency on the pixels of the input image 1901 where a thin line region is detected. As a result of the filter processing, the processing result 1905 is output.

As described above, when the input image 1901 including thin lines is subjected to the screen processing, the image processing apparatus according to the present exemplary embodiment can correct the input image based on an appropriately detected low-frequency component of the quantization error and can obtain an output image having higher reproducibility.

As illustrated in FIG. 20, if an image 2001 including edges is subjected to screen processing, jaggy occurs as understood from a processing result 2002.

Hence, a quantization error is calculated and the input image is corrected using a result of filter processing performed on the quantization error according to image features.

In the present exemplary embodiment, the input image 2001 is subjected to screen processing and its quantization error is subjected to filter processing using the filters 1701 and 1702.

First, in a case where the filter 1701 having a cutoff frequency equal to or lower than the screen frequency is employed in the filter processing, a low-frequency component 2004 of the quantization error can be obtained. After the input image 2001 is corrected based on the low-frequency component 2004 of the quantization error, if screen processing is performed on the corrected image, a processing result 2003 can be obtained.

The quantization error of each edge portion is excessively blurred out by the filter processing. Therefore, it is understood that the correction cannot be performed sufficiently and the jaggy cannot be improved at almost all of each edge portion.

On the other hand, in a case where the filter 1702 having a large cutoff frequency is employed in the filter processing, a low-frequency component 2006 of the quantization error can be obtained. After the input image 2001 is corrected based on the low-frequency component 2006 of the quantization error, if screen processing is performed on the corrected image, a processing result 2005 can be obtained.

According to the processing result 2005, it is understood that the input image can be corrected sufficiently and the jaggy at each edge portion can be reduced because the quantization error of each pixel of an edge portion where the jaggy occurs is not excessively blurred out. However, grainy effect deteriorates inside the edge portion, i.e., a rectangular gray region, because the quantization error includes higher frequency components.

Hence, the image processing apparatus 101 according to the present exemplary embodiment employs the filter 1702 having a large cutoff frequency in the filter processing to be performed on the quantization error of each pixel detected as an edge region (i.e., each side of a rectangle) in the input image 2001.

Further, the image processing apparatus 101 according to the present exemplary embodiment employs the filter 1701 having a cutoff frequency equal to or lower than the screen frequency in the filter processing to be performed on the quantization error of each pixel non-detected as an edge region (i.e., inside the rectangle) in the input image 2001.

Then, the image processing apparatus 101 according to the present exemplary embodiment corrects input image data based on a low-frequency component of the quantization error in a different frequency band. Further, the image processing apparatus 101 performs screen processing to output a processing result 2007. The processing result 2007 reveals that the jaggy along each edge portion decreases and the grainy effect inside the rectangle does not deteriorate.

As described above, when the input image 2001 including edges is subjected to the screen processing, the image processing apparatus according to the present exemplary embodiment can detect a frequency component of a quantization error suitable for correcting each pixel and can realize screen processing having higher reproducibility.

As described above, the frequency band of a quantization error suitable for the correction is variable depending on image features. A quantization error including frequency components ranging from a lower region to a higher region is suitable for correcting a thin line or an edge portion. However, in a case where a target region does not include any thin line (or edge portion), if correction is performed based on a quantization error, new moiré may occur and the grainy effect may deteriorate. Therefore, it is desired to remove any frequency component equal to or greater than the screen frequency (i.e., original moiré component) because these frequency components cause new moiré. In this respect, a quantization error that does not include such higher frequency components is suitable for the correction.

Hence, the image processing apparatus according to the present exemplary embodiment performs filter processing differently according to image features on a quantization error caused when the input image is subjected to the screen processing. When the input image is corrected using the quantization error appropriately detected according to the image, an output image having higher reproducibility can be obtained.

In the present exemplary embodiment, the image processing apparatus 101 employs the filter 1701 having low-pass characteristics (i.e., having a cutoff frequency equal to or lower than the screen frequency) for a target region if a thin line or an edge portion is not detected in this region. However, if the cutoff frequency is within an allowable range adjacent to the screen frequency, the cutoff frequency may not be restricted to be equal to or lower than the screen frequency.

Further, the image processing apparatus 101 according to the present exemplary embodiment calculates a correction value based on a detected quantization error and corrects the input image based on the calculated correction value. However, to obtain similar effects, the image processing apparatus according to the present exemplary embodiment can be configured to correct a threshold value for a target pixel based on a detected error. Further, the image processing apparatus according to the present exemplary embodiment can be configured to perform correction on a screen processed result.

Hereinafter, some modified embodiments of the fifth exemplary embodiment are described below. A modified embodiment 1 relates to a modified configuration of the filter processing unit. The configuration using two types of filters in the filter processing has been described in the fifth exemplary embodiment. However, the number of the filters to be used in the filter processing is not limited to two. Three or more types of filters can be used.

First, the thin line/edge detection unit 1509 calculates a thin line/edge intensity for each pixel by applying the Laplacian filter to an input image. In this case, with respect to the filter coefficient, a configuration capable of switching between three or more steps according to the thin line/edge intensity is employable.

Figure 21:
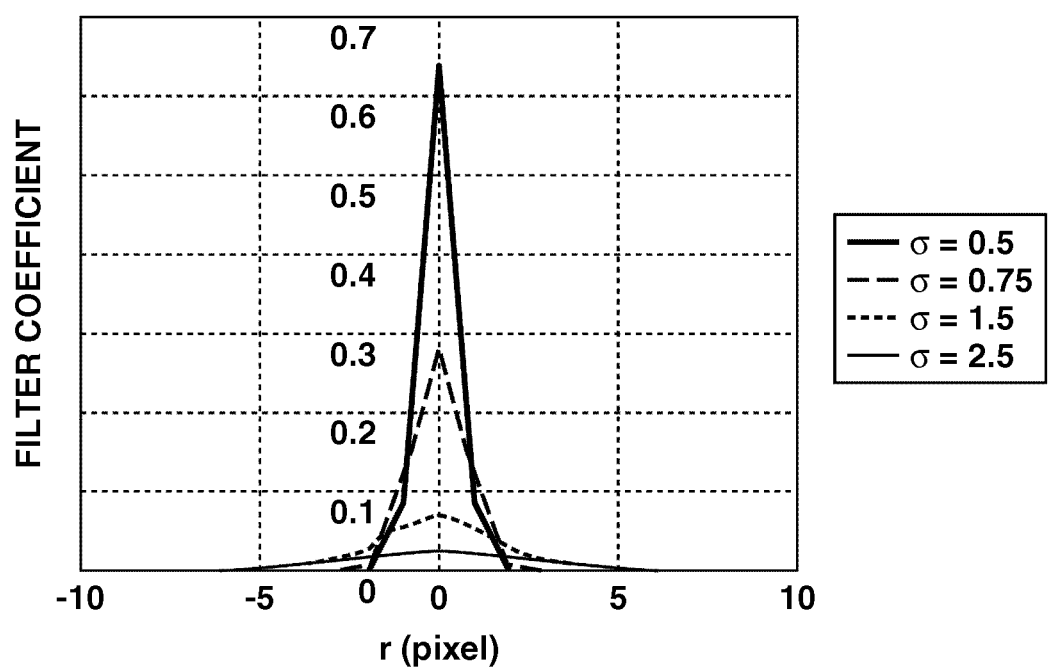
FIG. 21 illustrates example filter coefficients that can be used in the filter processing according to the fifth exemplary embodiment.

FIG. 21 is a one-dimensional expression illustrating four types of the Gaussian kernel defined by the formula (48), in which each type has a different σ value. In this case, one of the four types of filters is selectable according to the thin line/edge intensity. More specifically, if the thin line/edge intensity is high, it is desired to use a filter having a smaller σ value.

As another embodiment, a configuration capable of continuously changing the σ value according to the thin line/edge intensity is employable. Further, the filter coefficient is not limited to the Gaussian kernel. Any other kernel is usable.

The arrangement having been described in the fifth exemplary embodiment is configured to multiply the filter coefficient in the real space. However, a configuration capable of performing filter processing in a frequency space is employable.

Further, the filter processing unit 1510 can be configured to functionally operate as a filter bank that separates a quantization error into a plurality of sub-bands, processes these sub-bands according to their regions, and reconstructs the processed data. In this case, the filter processing unit 1510 performs processing in such a manner that the filter processed quantization error includes a greater amount of high-frequency components in a region where the thin line/edge intensity is high.

Further, in a case where the image data of a thin line/edge region is input, it is useful to perform correction using the input image data without performing filter processing on a quantization error. In other words, it is useful to perform an on/off switching operation of the filter processing in response to detection of a thin line or an edge region. In this case, the filter processing unit 1510 requires only one low-pass filter according to the screen frequency. In other words, a simple configuration is usable to obtain effects similar to those described in the present exemplary embodiment.

A modified embodiment 2 relates to a modified configuration of the input image correction unit.

The arrangements having been described in the fifth exemplary embodiment and the modified embodiment thereof are configured to subtract the filter processed quantization error from the color separated duty data. However, it is also useful to employ a configuration capable of subtracting weighted data from the filter processed quantization error.

For example, if higher correction intensity is required, it is useful to subtract data multiplied by a value greater than 1 from the filter processed quantization error. If lower correction intensity is required, it is useful to subtract data multiplied by a value smaller than 1 from the filter processed quantization error. In this case, a configuration capable of changing the correction intensity according to each image region is employable.

Further, the target image to be subjected to the correction according to the present exemplary embodiment is not limited to the color separated duty data and can be non-separated image data or any other image data generated through appropriate processing.

A modified embodiment 3 relates to a modified configuration of an image feature detection unit. The arrangement having been described in the fifth exemplary embodiment is configured to detect both the thin line and the edge portion. However, a configuration capable of detecting either one of the thin line and the edge portion is employable.

Further, a configuration capable of detecting a frequency band of input image data is employable. For example, it is useful to use the Laplacian filter to detect a high-frequency component of the image data. A higher region of the input image data detected in this case indicates a thin line or an edge portion.

Hence, it is useful to switch the filter processing according to the frequency band of a pixel. If a target region includes a frequency component in a predetermined frequency band, setting is performed to regard the target region as an edge (thin line) region.

Further, in a case where a target pixel includes a higher-frequency component exceeding the predetermined frequency band, it is useful to detect a high-frequency component of its quantization error. Further, if a target pixel is a lower-region pixel that does not include any frequency component in the predetermined frequency band, it is useful to detect a low-frequency component of its quantization error in a region adjacent to the screen frequency.

The above-described exemplary embodiments are configured to perform filter processing on a result obtained by subtracting both the color separated duty data and the screen processed data to calculate a quantization error. However, any other appropriate configuration capable of detecting a quantization error in a predetermined frequency band according to image features is employable.

For example, it is useful to perform filter processing on each of the color separated duty data and the screen processed data, and extract a low-frequency component of each processed data. In this case, the method further includes subtracting the low-frequency component of the color separated duty data and the low-frequency component of the screen processed data.

The filter processing units 108, 109, 804, and 805 having been described in the above-described exemplary embodiments and the modified embodiments are configured to generate filter processed images by obtaining the convolution of image data not yet subjected to the filter processing and the low-pass filter (LPF) in the real space. However, it is possible to improve processing accuracy if the filter processing is performed in the frequency space.

Further, as defined by the formulae (7) to (18), the image processing apparatus described in the above-described exemplary embodiment performs filter processing using a predetermined low-pass filter LPF on each of the screen processed data and the color separated duty data. Subsequently, the image processing apparatus obtains a difference in the filter processing result (i.e., a moiré component).

However, it is also useful to first calculate a difference between the screen processed data and the color separated duty data and subsequently perform filter processing on the calculated difference using a predetermined low-pass filter LPF.

In a case where the predetermined low-pass filter is a linear filter, the above-described difference calculation processing and the filter processing are substantially equivalent to each other. Similarly, in the calculation of the inter-color moiré, it is useful to first obtain a difference and subsequently perform filter processing on the obtained difference value.

The example image processing apparatus having been described in the above-described exemplary embodiment and the modified embodiment is an electrophotographic image processing apparatus. However, the present invention is applicable to an inkjet type, a thermal transfer type, an offset printing type, or any other type of recording apparatus that performs recording processing according to a method other than the electrophotographic method.

Further, the present invention can be embodied as a system, an apparatus, a method, a program, or a storage medium (or a recording medium). The present invention is applicable to a system including a plurality of devices (e.g., a host computer, interface devices, an imaging device, web applications, etc.) and is also applicable to an apparatus including a single device. In an example, a computer-readable medium may store a program that causes an image processing apparatus to perform a method described herein. In another example, a central processing unit (CPU) may be configured to control at least one unit utilized in a method or apparatus described herein. Each apparatus may be implemented within, include, or otherwise be connected to a central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs.

The present invention can be realized by directly or remotely supplying a software program to a system or an apparatus and causing a computer in the system or the apparatus to read out a supplied program code and execute the readout program. The program executed in this case is a program capable of realizing the functions described in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-174789 filed Aug. 3, 2010 and No. 2010-195706 filed Sep. 1, 2010, which are hereby incorporated by reference herein in their entirety.

What is claimed is:

1. An image processing apparatus comprising:
    a first screen processing unit configured to perform screen processing on input image data to form screen processed image data;
    a moire component calculation unit configured to calculate an original moire component that corresponds to a low-frequency component of the screen processed image data and a low-frequency component of the input image data;
    a first correction unit configured to correct the input image data based on a calculated moire component; and
    a second screen processing unit configured to perform screen processing on the corrected image data, wherein, if the input image data is not a region corresponding to a thin line or an edge, a filter processing unit is configured to use a first filter having a cutoff frequency that corresponds to a screen frequency of a screen to be used in the screen processing to perform filter processing on a difference between the input image data and the screen processed image data.

2. The image processing apparatus according to claim 1, wherein the moire component calculation unit is configured to perform the filter processing using a low-pass filter on the difference value between the input image data and the screen processed image data to calculate the original moire component.

3. The image processing apparatus according to claim 1, further comprising:
 a first calculation unit configured to calculate an original moire component that represents moire between an original and a screen,
 wherein the first correction unit is configured to remove the original moire component from the input image data.

4. The image processing apparatus according to claim 1, further comprising:
 an inter-color moire component calculation unit configured to calculate an inter-color moire component that represents moire between different color screens based on input image data of a plurality of colors; and
 a second correction unit configured to remove the inter-color moire component calculated by the second calculation unit from the input image data of the plurality of colors.

5. An image processing apparatus comprising:
 a screen processing unit configured to perform screen processing on input image data to form screen processed image data;
 an image feature detection unit configured to detect feature information of the input image data; and
 an error detection unit configured to detect a component value of a difference between the input image data and the screen processed image data as data processed by the screen processing unit, in a frequency band corresponding to the feature information,
 wherein, if the input image data is not a region corresponding to a thin line or an edge, the filter processing unit is configured to use a first filter having a cutoff frequency that corresponds to a screen frequency of a screen to be used in the screen processing to perform filter processing on the obtained difference.

6. The image processing apparatus according to claim 5, further comprising:
 a processing unit configured to perform processing based on a result obtained by the error detection unit.

7. The image processing apparatus according to claim 6, wherein the processing unit is configured to correct the input image data.

8. The image processing apparatus according to claim 6, wherein the processing unit is configured to correct the screen processed image data.

9. The image processing apparatus according to claim 6, wherein the processing unit is configured to correct a threshold value for a screen to be used by the screen processing unit.

10. The image processing apparatus according to claim 5, wherein the image feature detection unit is configured to determine whether the input image data includes an edge.

11. The image processing apparatus according to claim 5, wherein the image feature detection unit is configured to determine whether the input image data includes a thin line.

12. An image processing apparatus according to claim 5, wherein the error detection unit includes:
 a subtraction unit configured to obtain the difference between the input image data and the screen processed image data; and
 the filter processing unit configured to perform the filter processing using a low-pass filter on the obtained difference.

13. The image processing apparatus according to claim 12, wherein, if the input image data is the thin line or the edge, the filter processing unit is configured to use a second filter having a cutoff frequency that is higher than that of the first filter to the perform filter processing on the obtained difference.

14. The image processing apparatus according to claim 12, wherein, if the input image data is the thin line or the edge, the filter processing unit does not perform the filter processing on the obtained difference.

15. The image processing apparatus according to claim 12, wherein, the filter processing unit is configured to change a filter coefficient of the low-pass filter to be used in the filter processing according to an intensity of the thin line or the edge detected by the image feature detection unit.

16. The image processing apparatus according to claim 5, wherein the image feature detection unit is configured to detect frequency information of the input image data as the feature information.

17. The image processing apparatus according to claim 5, wherein the error detection unit is configured to obtain a low-frequency component of the input image data and a low-frequency component of a processing result obtained by the screen processing unit, and further configured to calculate the difference between the low-frequency component of the input image data and the low-frequency component of the processing result obtained by the screen processing unit.

18. An image processing method for an image processing apparatus, the image processing method comprising:
 performing screen processing on input image data to form screen processed image data;
 calculating an original moire component that corresponds to a low-frequency component of the screen processed image data and a low-frequency component of the input image data;
 correcting the input image data based on the calculated moire component; and
 performing the screen processing on the corrected input image data,
 wherein, if the input image data is not a region corresponding to a thin line or an edge, using a first filter having a cutoff frequency that corresponds to a screen frequency of a screen to be used in the screen processing to perform filter processing on a difference between the input image data and the screen processed image data.

19. An image processing method comprising:
 performing screen processing on input image data;
 detecting feature information of the input image data; and
 detecting a component value of a difference between the input image data and the screen processed image data as data processed, in a frequency band corresponding to the feature information,
 wherein, if the input image data is not a region corresponding to a thin line or an edge, using a first filter having a cutoff frequency that corresponds to a screen frequency of a screen to be used in the screen processing to perform filter processing on the difference between the input image data and the screen processed image data.

20. A non-transitory computer readable storage medium storing a program that causes a computer to execute image processing method, the image processing method comprising:
- performing screen processing on input image data to form screen processed image data;
- calculating an original moire component that corresponds to a low-frequency component of the screen processed image data and a low-frequency component of the input image data;
- correcting the input image data based on a calculated moire component; and performing the screen processing on the corrected input image data; and
- performing the screen processing on the corrected input image data,
- wherein, if the input image data is not a region corresponding to a thin line or an edge, using a first filter having a cutoff frequency that corresponds to a screen frequency of a screen to be used in the screen processing to perform filter processing on a difference between the input image data and the screen processed image data.

* * * * *